United States Patent
Kubo et al.

(10) Patent No.: US 9,323,494 B2
(45) Date of Patent: Apr. 26, 2016

(54) IMAGE PROCESSING SYSTEM, IMAGE PROCESSING APPARATUS, PORTABLE INFORMATION TERMINAL, COMPUTER-READABLE STORAGE MEDIUM WITH ENHANCED DISPLAY CAPABILITIES

(71) Applicant: Konica Minolta, Inc., Chiyoda-ku (JP)

(72) Inventors: Hiroaki Kubo, Muko (JP); Kaitaku Ozawa, Nishinomiya (JP); Shoji Imaizumi, Shinshiro (JP); Takeshi Minami, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/258,068

(22) Filed: Apr. 22, 2014

(65) Prior Publication Data

US 2014/0320912 A1    Oct. 30, 2014

(30) Foreign Application Priority Data

Apr. 30, 2013    (JP) .................................. 2013-95484

(51) Int. Cl.
*G06F 3/12*    (2006.01)
*G06F 3/14*    (2006.01)
*G09G 5/14*    (2006.01)

(52) U.S. Cl.
CPC ............ *G06F 3/1292* (2013.01); *G06F 3/1204* (2013.01); *G06F 3/1253* (2013.01);
(Continued)

(58) Field of Classification Search
USPC ......... 358/1.15, 400, 434, 442; 715/700, 706, 715/773
See application file for complete search history.

(56) References Cited

U.S. PATENT DOCUMENTS 6,411,275 B1    6/2002    Hedberg
8,730,269 B2 *    5/2014    Pinto et al. .................... 345/684
(Continued)

FOREIGN PATENT DOCUMENTS

JP    2000-181298 A    6/2000
JP    2003-054093 A    2/2003
(Continued)

OTHER PUBLICATIONS

Notice of Reasons for Rejection issued Apr. 15, 2015 in corresponding Japanese Patent Application No. 2013-095484, filed on Apr. 30, 2013, with English translation (14 pages).

*Primary Examiner* — Thomas D Lee
(74) *Attorney, Agent, or Firm* — Buchanan Ingersoll & Rooney PC

(57) ABSTRACT

An image processing system includes an image processing apparatus. A portable information terminal is communicable with the image processing apparatus. The image processing apparatus includes a first display section, a storage section, and a first control section. The storage section stores screen data to be displayed on the first display section. The first control section controls the first display section to display an image indicating a first region contained in a virtual display screen corresponding to the screen data. The portable information terminal includes a second display section and a second control section. The second control section controls the second display section to display an image indicating a second region generated correspondingly to positional relationship information indicating a relative positional relationship between the first display section and the second display section.

20 Claims, 21 Drawing Sheets

(52) U.S. Cl.
CPC ............ *G06F3/1423* (2013.01); *G06F 3/1454* (2013.01); *G09G 5/14* (2013.01); *G09G 2370/042* (2013.01); *G09G 2370/16* (2013.01)

(56) References Cited

U.S. PATENT DOCUMENTS

| | | |
|---|---|---|
| 2005/0168399 A1 | 8/2005 | Palquist |
| 2010/0225664 A1 | 9/2010 | Ogasawara |
| 2010/0269038 A1 | 10/2010 | Tsuda |
| 2012/0194859 A1 | 8/2012 | Oda |
| 2012/0327443 A1 | 12/2012 | Fujii |
| 2013/0219303 A1* | 8/2013 | Eriksson et al. .............. 715/759 |
| 2014/0313103 A1* | 10/2014 | Goel et al. .................... 345/2.2 |

FOREIGN PATENT DOCUMENTS

| | | |
|---|---|---|
| JP | 2007514978 A | 6/2007 |
| JP | 2010204990 A | 9/2010 |
| JP | 2012156872 A | 8/2012 |
| JP | 2012524318 A | 10/2012 |
| JP | 2013-008279 A | 1/2013 |

* cited by examiner

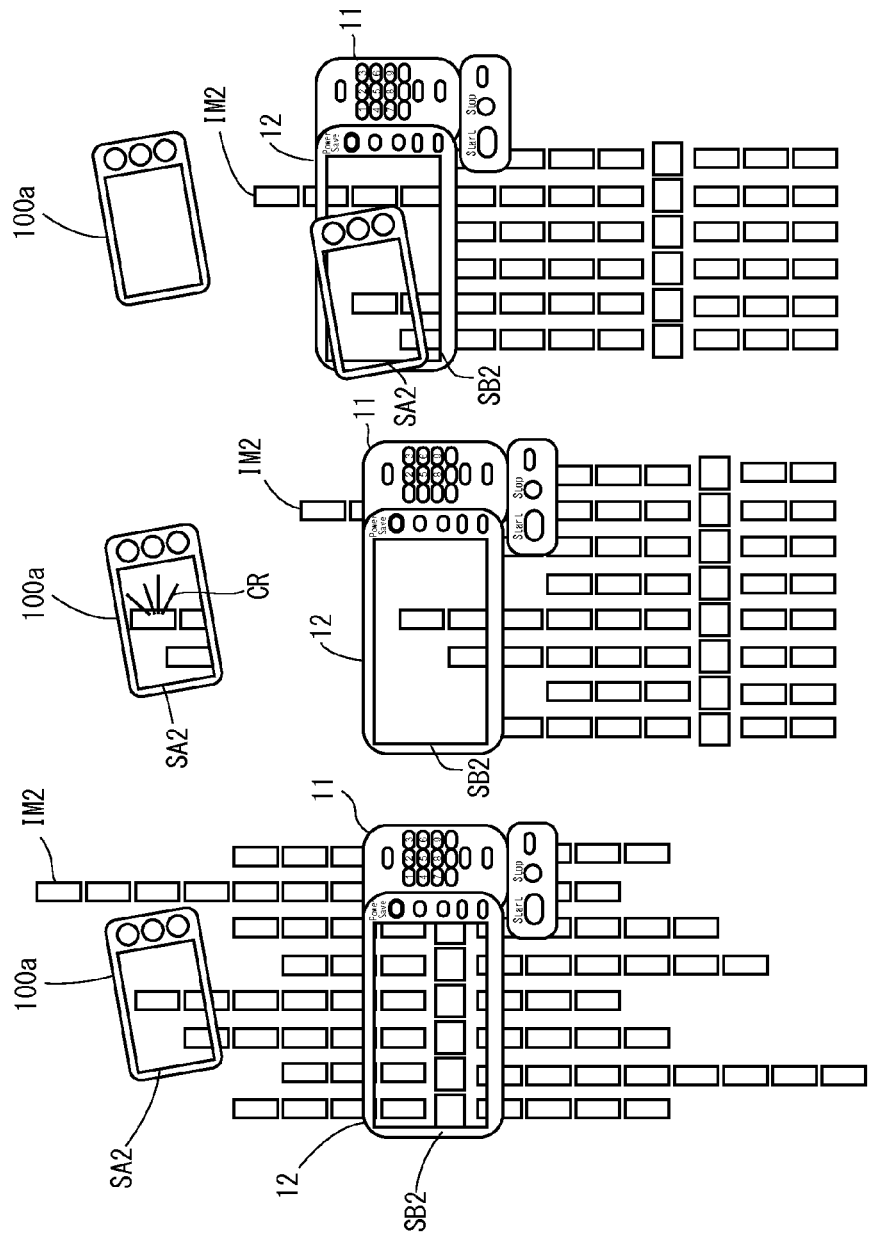

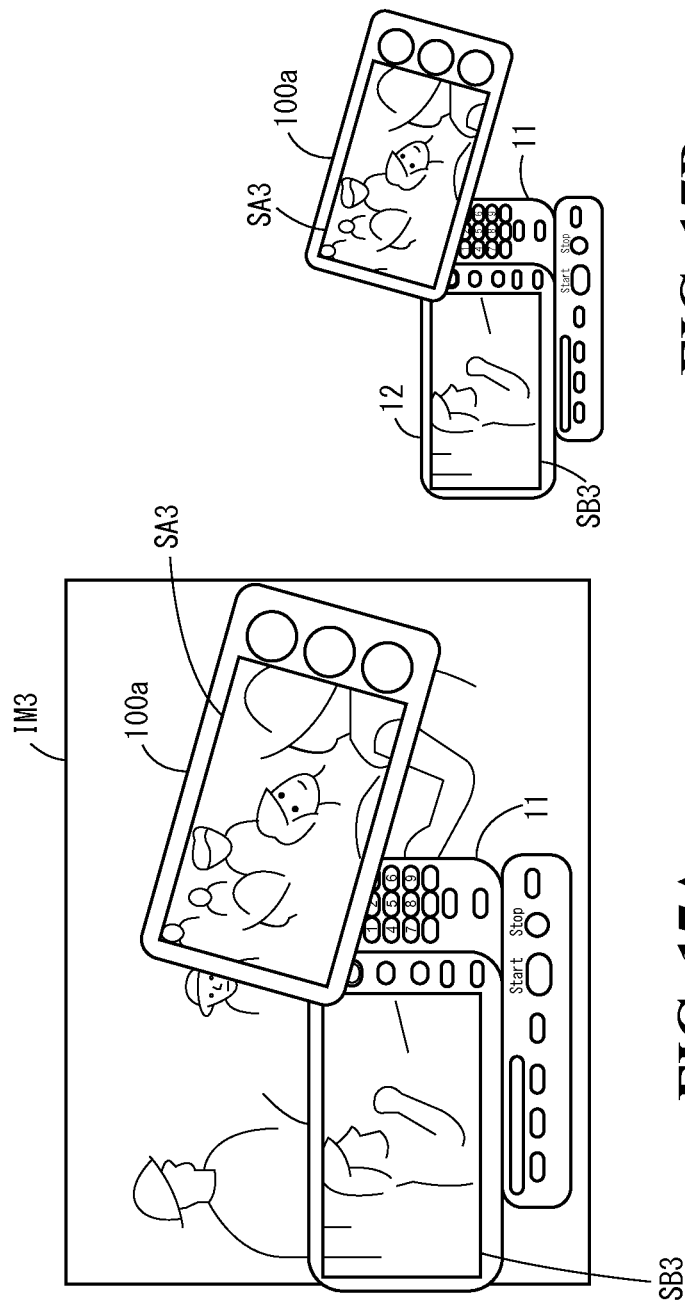

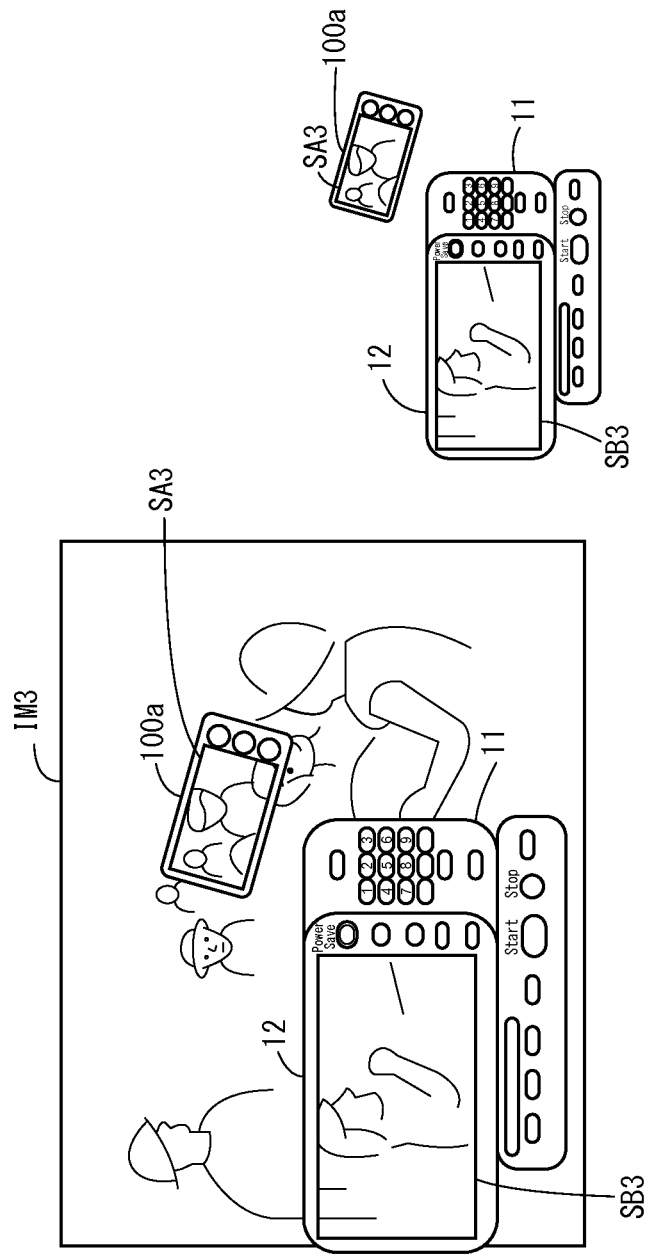

IMAGE PROCESSING SYSTEM, IMAGE PROCESSING APPARATUS, PORTABLE INFORMATION TERMINAL, COMPUTER-READABLE STORAGE MEDIUM WITH ENHANCED DISPLAY CAPABILITIES

CROSS-REFERENCE TO RELATED APPLICATIONS

The present application claims priority under 35 U.S.C. §119 to Japanese Patent Application No. 2013-095484, filed Apr. 30, 2013. The contents of this application are incorporated herein by reference in their entirety.

BACKGROUND OF THE INVENTION

1. Field of the Invention

The present invention relates to an image processing system, an image processing apparatus, a portable information terminal, and a computer-readable storage medium.

2. Discussion of the Background

In recent years, portable information terminals including smartphones and tablet terminals, which are capable of processing various kinds of information such as images, have been used in a wide variety of fields. This also applies to the field of image processing apparatuses associated with printers (including network printers), scanners, facsimiles, copying machines, document servers, and multi-functional machines having a combination of the foregoing functions.

An example is disclosed in Japanese Unexamined Patent Application Publication No. 2003-54093, which recites a technology involving use of a liquid crystal panel for a portable phone as a display device for a printer.

Japanese Unexamined Patent Application Publication No. 2000-181298 describes a technology involving use of a laptop PC (Personal Computer) as a remote control device for a copying machine to display on the laptop PC a screen identical to the display section of the copying machine.

It is conventionally known practice to impart a touch screen function to the display section of the image processing apparatus so as to perform various kinds of operations on a display screen. Recently, as the number of functions increases, it is required to allow multiple functions to be directly operated in an easier-to-understand manner.

FIGS. 21A and 21B are diagrams illustrating display screens according to a conventional image processing apparatus. As shown in FIGS. 21A and 21B, a display section 12 is disposed adjacent to an operation section 11. In the operation section 11, frequently used number keys and other keys are configured as hardware switch keys. The display section 12 displays a screen through which operations are performed.

In FIG. 21A, a large number of various kinds of buttons to implement multiple functions (regions indicated by rectangular shapes in FIG. 21A) are displayed within the screen on the display section 12. However, the area of the display panel of the display section 12 is finite. Hence, when various kinds of button displays to implement the multiple functions are gathered within one screen, the buttons can be difficult to see and operate.

FIG. 21B shows a configuration in which the number of the various kinds of buttons to be displayed on the screen of the display section 12 is decreased in an attempt to alleviate the viewing difficulty. In this case, decreasing the number of displays for the various kinds of buttons (the regions indicated by rectangular shapes in FIG. 21B) may make the screen easier to see. However, the following procedure is necessary for implementing various kinds of multiple functions. Upon pressing a button (for example, a paper size selection button), a screen of a lower hierarchy level that displays a plurality of options corresponding to the button (for example, paper sizes B4, A4, B3, and A3) is to be displayed, and one of buttons corresponding to the options is then pressed. With this procedure, the number of button pressing occasions increases, and poor operability remains. Hence, it is difficult to say that the multiple functions can be directly operated in an easier-to-understand manner.

FIGS. 22A and 22B are diagrams illustrating other display screens according to the conventional image processing apparatus. FIGS. 22A and 22B show the operation section 11 and the display section 12 similar to the operation section 11 and the display section 12 in FIGS. 21A and 21B. The display section 12 displays print preview data of a to-be-printed image that has been read by a scanner or a similar device incorporated in the image processing apparatus, or that has been transferred from an external PC or another external device. This ensures checking whether the image data as a print target includes dirt or other problems before actual printing.

In FIG. 22A, the entirety of the print target image data is displayed on the display section 12. In this case, a user can have a full grasp of the print target image data, but cannot look into the details of the print target image data from the display section 12 because the display area of the display section 12 is small.

FIG. 22B shows a case where part of the print target image data shown in FIG. 22A is displayed in enlarged dimension on the display section 12. In this case, it is possible to check whether the print target image data includes dirt or other problems because the details of the print target image data are displayed in enlarged dimension. However, it is difficult to have a full grasp of the print target image data. That is, the states shown in FIGS. 22A and 22B are two alternatives that make it difficult to have a full grasp of the print target image data and the details of the print target image data at the same time.

Both of the above problem related to FIGS. 21A and 21B and the above problem related to FIGS. 22A and 22B are due to the fact that the size of the display section 12 of the image processing apparatus is infinite and small. Of course, increasing the area of the display panel of the display section 12 may contribute to solution of the problems. This may, however, cause other problems such as an increase in the area where the image processing apparatus is provided, and increased costs for the display section.

The present invention has been made in view of the above-described circumstances, and it is an object of the present invention to provide an ease with which to have a full grasp and have details of a display content in an image processing apparatus including a display section of a finite size without upsizing the image processing apparatus.

SUMMARY OF THE INVENTION

According to one aspect of the present invention, an image processing system includes an image processing apparatus and a portable information terminal. The portable information terminal is communicable with the image processing apparatus. The image processing apparatus includes a first display section, a storage section, and a first control section. The storage section is configured to store screen data to be displayed on the first display section. The first control section is configured to control the first display section to display an image indicating a first region contained in a virtual display screen corresponding to the screen data. The portable information terminal includes a second display section and a second control section. The second control section is configured to control the second display section to display an image indicating a second region generated correspondingly to positional relationship information indicating a relative positional relationship between the first display section and the second display section.

According to another aspect of the present invention, an image processing apparatus is communicable with a portable information terminal. The image processing apparatus includes a first display section, a storage section, a first control section, a position obtaining section, an image generation section, and a transmission section. The storage section is configured to store screen data to be displayed on the first display section. The first control section is configured to control the first display section to display an image indicating a first region contained in a virtual display screen corresponding to the screen data. The position obtaining section is configured to obtain positional relationship information indicating a relative positional relationship between the first display section and a second display section disposed in the portable information terminal. The image generation section is configured to generate an image indicating a second region that is contained in the virtual display screen and is based on the positional relationship information obtained by the position obtaining section. The transmission section is configured to transmit the image indicating the second region generated by the image generation section to the portable information terminal.

According to another aspect of the present invention, a portable information terminal is communicable with an image processing apparatus. The portable information terminal includes a second display section, a position obtaining section, and a second control section. The position obtaining section is configured to obtain positional relationship information indicating a relative positional relationship between the second display section and a first display section disposed in the image processing apparatus. The second control section is configured to control the second display section to display an image indicating a second region that is contained in a virtual display screen disposed in the image processing apparatus and is generated based on the positional relationship information so as to correspond to a relative positional relationship between the first display section and the second display section.

According to the other aspect of the present invention, a program is for causing a portable information terminal to perform an operation. The portable information terminal is communicable with an image processing apparatus and includes a second display section. The operation includes obtaining positional relationship information indicating a relative positional relationship between the second display section and a first display section disposed in the image processing apparatus. An image is displayed on the second display section. The image indicates a second region that is contained in a virtual display screen generated in the image processing apparatus and is generated so as to correspond to the relative positional relationship between the first display section and the second display section based on the positional relationship information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 10A to 10C are diagrams illustrating other examples of the linked remote panel operation;

FIGS. 17A and 17B are diagrams illustrating other examples of the linked remote panel operation;

FIGS. 18A and 18B are diagrams illustrating other examples of the linked remote panel operation;

DESCRIPTION OF THE EMBODIMENTS

Figure 1:
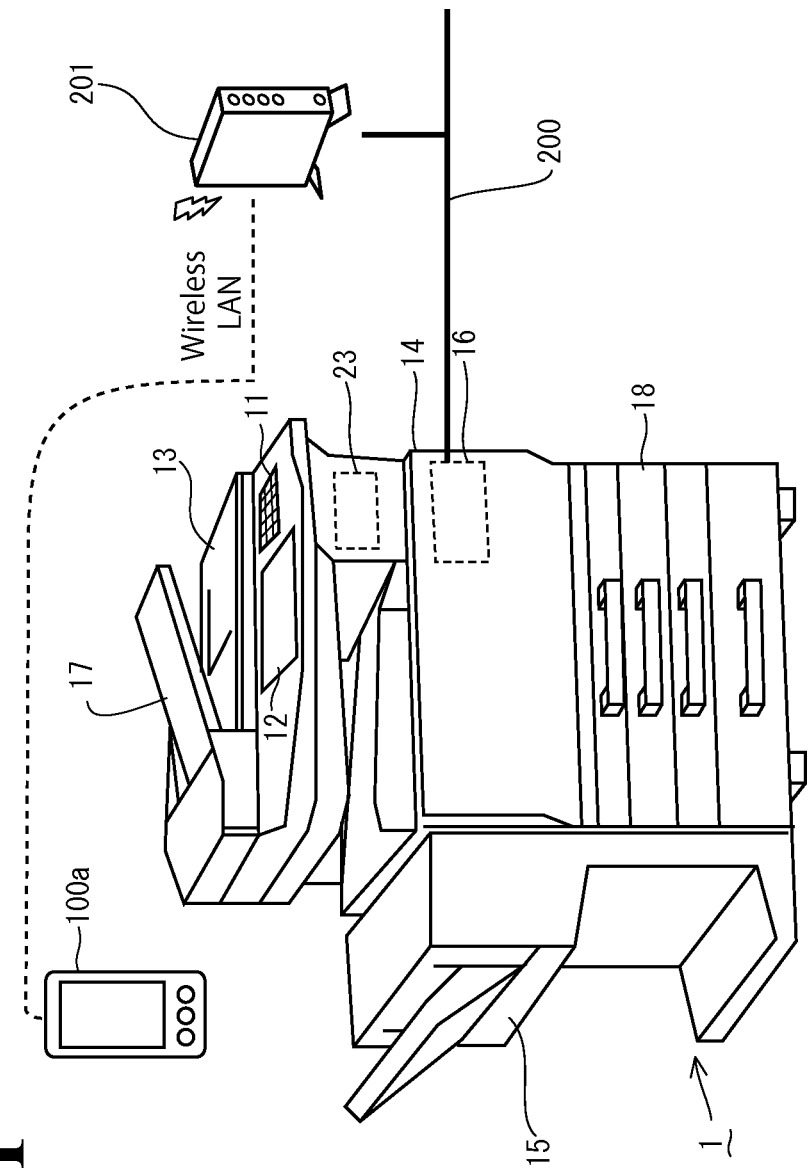
FIG. 1 is a diagram illustrating a configuration of an image processing system according to a first embodiment of the present invention.

The embodiments will now be described with reference to the accompanying drawings, wherein like reference numerals designate corresponding or identical elements throughout the various drawings.

<First Embodiment>

This embodiment is regarding an image processing system that is capable of displaying a partial region of a virtual display screen on a display section of an image processing apparatus, and that is capable of displaying another partial region of the virtual display screen on a display section of a portable information terminal.

FIG. 1 is a diagram illustrating a configuration of the image processing system according to this embodiment. The image processing system includes a portable information terminal 100a, a network 200, and an image processing apparatus 1. An example of the portable information terminal 100a is a smartphone. The network 200 is a communication network of either a closed network such as LAN (Local Area Network) or an open network such as the Internet. The image processing apparatus 1 is a printer (including a network printer), a scanner, a facsimile, a copying machine, a document server, or a multi-functional machine having a combination of the foregoing functions.

The portable information terminal 100a is connectable with the network 200 via a wireless LAN access point 201. Also the portable information terminal 100a is communicable with the image processing apparatus 1 via the network 200. In this embodiment, however, the network 200 and the wireless LAN access point 201 may not necessarily be provided. For example, the portable information terminal 100a may be directly communicable with the image processing apparatus 1 in a wireless or wired manner (that is, it is possible to use what is called a peer-to-peer connection).

Figure 2:
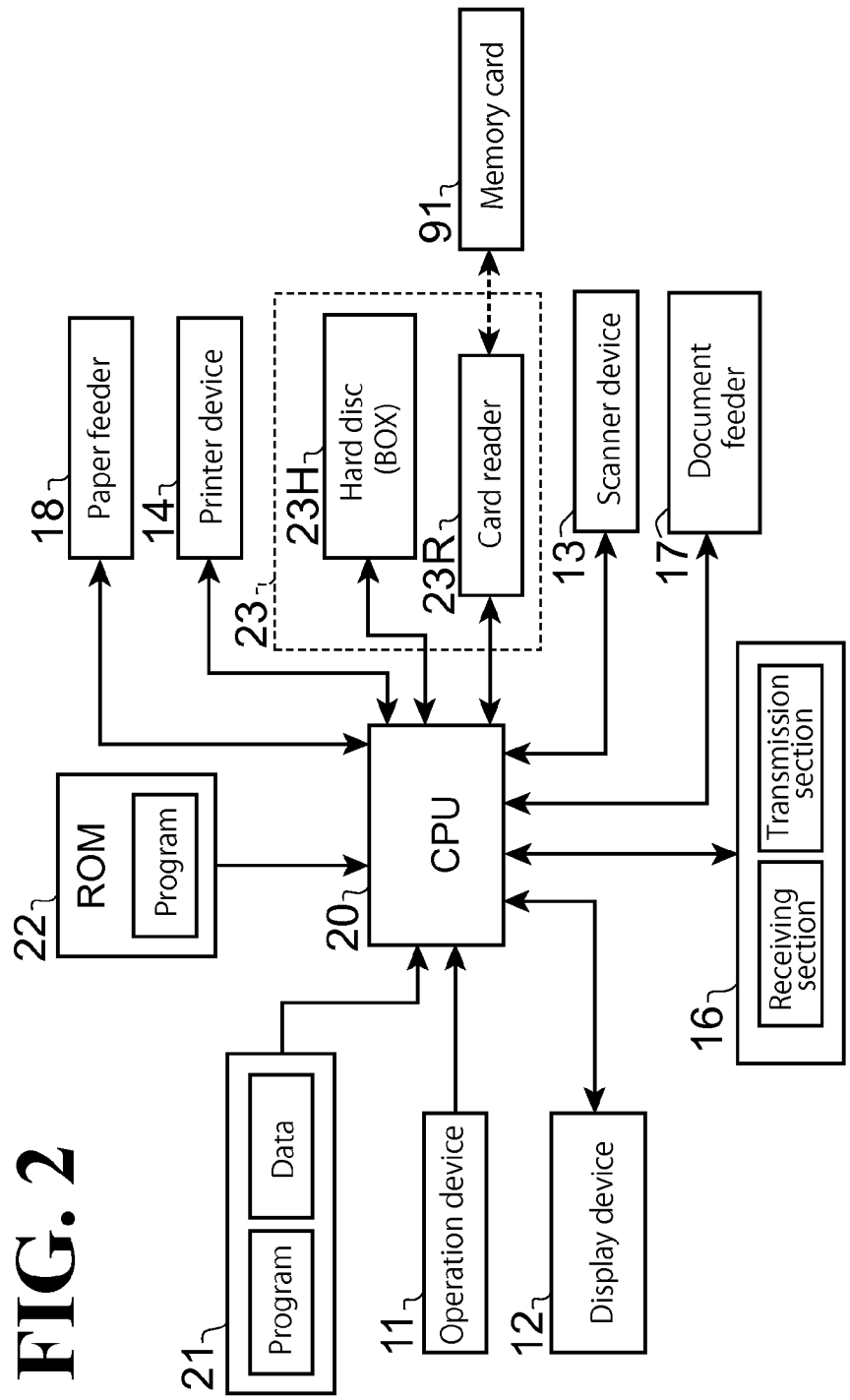
FIG. 2 is a block diagram illustrating a detailed configuration of an image processing apparatus.

FIG. 2 is a block diagram illustrating a detailed configuration of the image processing apparatus 1. The image processing apparatus 1 includes an operation device 11, a display (display device) 12, a scanner device 13, a printer device 14, a finisher device 15, a communication interface 16, a document feeder 17, a paper feeder 18, a CPU (Central Processing Unit) 20, a RAM (Random Access Memory) 21, a ROM (Read Only Memory) 22, and a data storage section 23. The operation device 11 is an operation section. The display 12 is a display section. The scanner device 13 is used for image reading. The printer device 14 is used for image formation. The finisher device 15 subjects a printed matter to post-processing such as stapling and punching. The communication interface 16 communicates with the outside. The CPU 20 controls operations of the individual sections. The RAM 21 temporarily stores programs and data. The ROM 22 stores a control program and other programs.

The image processing apparatus 1 may be set to ensure that no user is allowed to use the image processing apparatus 1 unless the user is authenticated based on user information registered in advance in the data storage section 23.

The operation device 11 includes a plurality of hardware switch keys, a sensor, and a transmission circuit. The plurality of hardware switch keys are for inputting figures, characters, and symbols. The sensor is for recognizing a pressed key. The transmission circuit is for transmitting a signal indicating a recognized key to the CPU 20.

The display 12 includes a liquid crystal display and an organic EL (ElectroLuminescence) display, and has a touch screen (touch panel) function. The display 12 displays screens such as a screen through which a message or command is provided to a user, a screen through which the user inputs a setting content and a processing content, and a screen for displaying an image and a processing result obtained by the image processing apparatus 1. The display 12 has the touch screen function, which includes a function to detect a touch position of the user's finger on the screen, and a function to transmit a signal indicating a detection result to the CPU 20.

The network 200 may also be connected with a device such as a PC (Personal Computer), not shown, to provide a printing command and a scanning command to the image processing apparatus 1. In the device, an application program and a driver are installed to provide various commands to the image processing apparatus 1. The user may use the device to remotely operate the image processing apparatus 1 (for example, to use the image processing apparatus 1 as a network printer).

The scanner device 13 photoelectrically reads image information, such as a photograph, characters, and a picture, from an original so as to obtain image data. The obtained image data (concentration data) is converted into digital data and subjected to known various kinds of image processing in an image processing section that is disposed in the scanner device 13 and not shown. Then, the resulting image data is transmitted to the printer device 14 and the communication interface 16. The resulting image data is used for image printing and data transmission, or stored in the data storage section 23 for later use.

The printer device 14 prints image data obtained by the scanner device 13, image data received from outside via the communication interface 16, or an image stored in the data storage section 23 onto a recording sheet, such as a sheet of paper and film fed from the paper feeder 18. The paper feeder 18 is disposed at a lower portion of the image processing apparatus 1, and is used to feed a recording sheet suitable for an image as a print target to the printer device 14.

The recording sheet loaded with the image printed by the printer device 14 is now a printed matter and fed to the finisher device 15. The finisher device 15 performs processing such as punching and stapling according to a mode set in advance by the user. The printed matter is then discharged onto a tray of the finisher device 15.

The communication interface 16 includes a transmission section and a receiving section respectively to transmit and receive signals used for external communication. Specifically, the communication interface 16 includes a wireless communication device, a NIC (Network Interface Card), a modem, or a TA (Terminal Adapter) so as to communicate with the portable information terminal 100a and the external device such as PC.

The data storage section 23 includes a hard disc 23H and a card reader 23R. The hard disc 23H is a mass storage medium. The card reader 23R exchanges information with a memory card 91, which is a removable storage medium. Specifically, the card reader 23R reads data from the memory card 91, which is a compact flash (registered trademark) or a smart medium, or writes data into the memory card 91. The memory card 91 is mainly used to exchange data with an external PC, not shown, without the intervention of the network 200, and used to make a backup of the data of the hard disc 23H.

The hard disc 23H stores data such as image data read by the scanning unit 13, and image data received from outside via the communication interface 16. The data in the hard disc 23H may be referred to from an external PC, not shown, and another image processing apparatus via the network 200.

The CPU 20 reads a program stored in the ROM 22 or reads a program or data loaded in the RAM 21, and executes the program or processes the data so as to control the entirety of the image processing apparatus 1.

Figure 3:
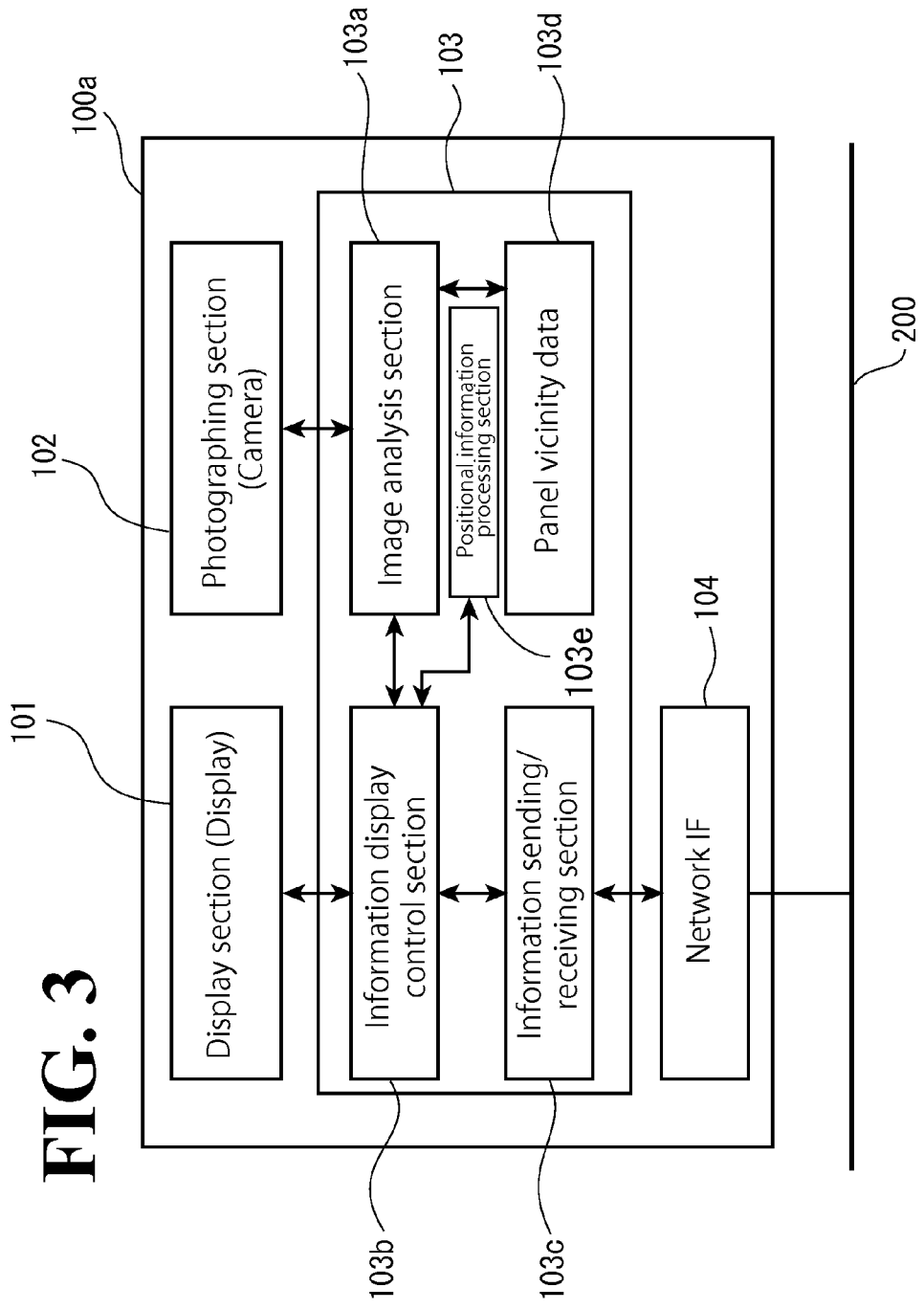
FIG. 3 is a block diagram illustrating a detailed configuration of a portable information terminal.

FIG. 3 is a block diagram illustrating a detailed configuration of the portable information terminal 100a. The portable information terminal 100a includes a liquid display and an organic EL display, among other components. The portable information terminal 100a includes a display section 101, a photographing section 102, an image processing section 103, and a network interface 104. The display section 101 has a touch screen function. The photographing section 102 includes a CMOS (Complementary Metal Oxide Semiconductor) image sensor camera, and a CCD (Charge Coupled Device) image sensor camera, among other components. The image processing section 103 performs image processing with respect to an image to be displayed on the display section 101 and an image photographed by the photographing section 102. The network interface 104 is an interface to establish a connection to the network 200. To simplify the illustration, FIG. 3 omits the wireless LAN access point 201 between the portable information terminal 100a and the network 200.

The image processing apparatus 103 includes an image analysis section 103a, an information display control section 103b, an information sending/receiving section 103c, panel vicinity data 103d, and a positional information processing section 103e. These sections and data will be described in detail later.

The image processing system according to this embodiment implements a function of what is called a remote panel operation. The remote panel operation enables the portable information terminal 100a to be used as a remote control device for the image processing apparatus 1. It should be noted, however, that the remote panel operation is not intended to mean the only function of sole remote panel operation. In the sole remote panel operation, the display section 101 of the portable information terminal 100a merely displays an identical display screen to the display screen on the display 12 of the image processing apparatus 1, and the operation on the display section 101 of the portable information terminal 100a is given priority over the operation on the display 12 of the image processing apparatus 1.

In addition to the sole remote panel operation, the remote panel operation in this embodiment includes a function of linked remote panel operation. The linked remote panel operation enables a linkage between the image processing apparatus 1 and the portable information terminal 100a. The function of the linked remote panel operation will be described in detail below. The selection between the linked remote panel operation and the sole remote panel operation may be made by the user's operation through the display section 101 of the portable information terminal 100a, or through the display 12 or the operation device 11 of the image processing apparatus 1.

In the linked remote panel operation according to this embodiment, the user brings the portable information terminal 100a to a vicinity of the display 12 of the image processing apparatus 1. This causes the display 12 to display a partial region of a virtual display screen having an area exceeding the display area on the display 12. The display section 101 of the portable information terminal 100a obtains positional relationship information (such as coordinate information) indicating a relative positional relationship between the display 12 and the display section 101. Based on the positional relationship information, the display section 101 displays another partial region of the virtual display screen that is un-overlapped or overlapped with the partial region displayed on the display 12.

Figure 4:
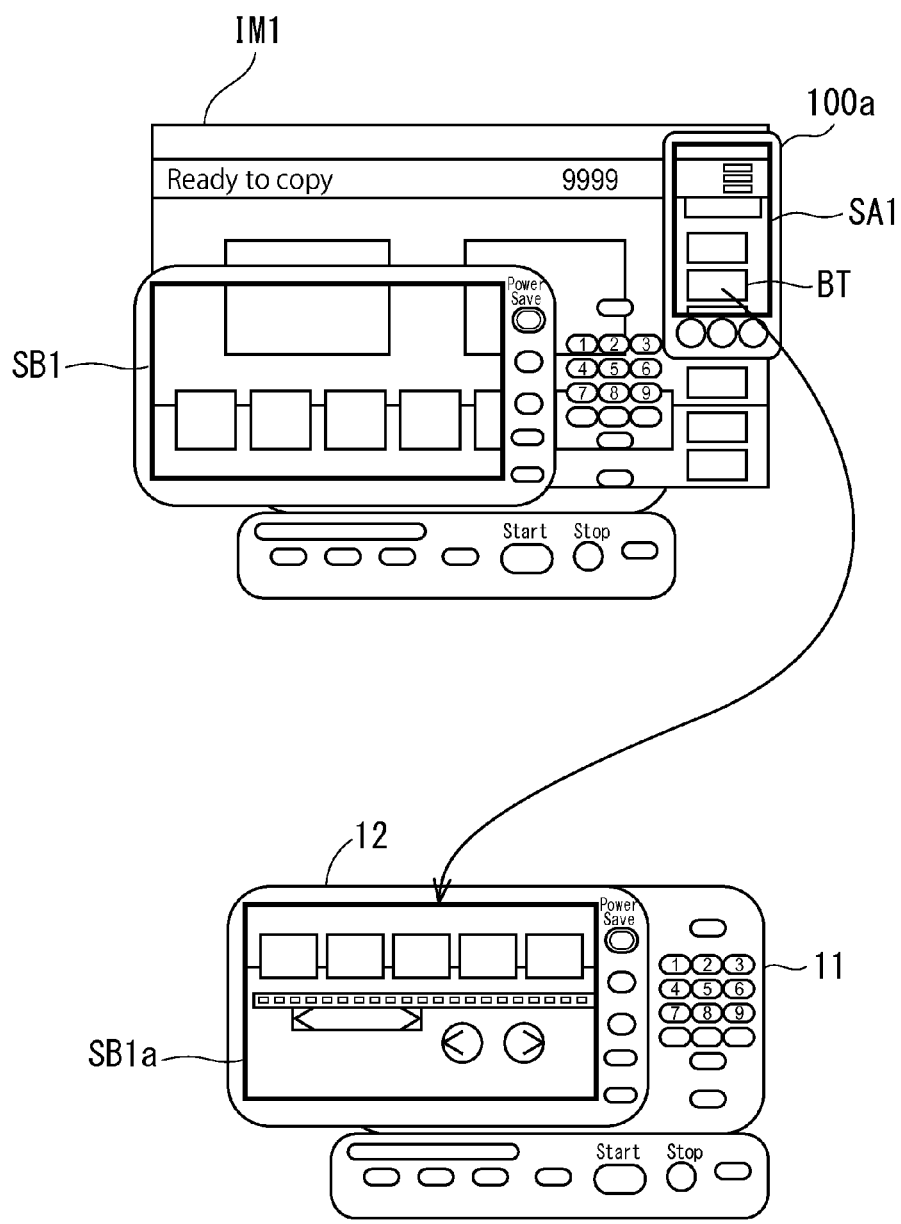
FIG. 4 is a diagram illustrating a linked remote panel operation according to an embodiment of the present invention.

FIG. 4 is a diagram illustrating a linked remote panel operation according to this embodiment. This diagram shows a state in which the display 12 of the image processing apparatus 1 displays a display screen SB1. The display screen SB1 shows a partial region of a virtual display screen IM1, which has an area exceeding the display area on the display 12. The display section 101 of the portable information terminal 100a displays a display screen SA1. The display screen SA1 shows another partial region of the virtual display screen IM1 that is un-overlapped with the display screen SB1 displayed on the display 12. Depending on the relative positional relationship between the display 12 and the display section 101, the display screen SA1 on the display section 101 of the portable information terminal 100a may show still another partial region of the virtual display screen IM1 that is partially or entirely overlapped with the display screen SB1 displayed on the display 12.

The virtual display screen IM1 in this embodiment is a virtual display screen with a large number of various kinds of buttons (portions respectively indicated by rectangular shapes) arranged to implement multiple functions. For example, when the user touches a button BT within the display screen SA1 on the display section 101 of the portable information terminal 100a, a display screen SB1a may be displayed on the display 12 as shown in the lower stage of FIG. 4. The display screen SB1a shows a different content from the content shown on the display screen SB1.

It is of course possible to perform another operation when the user touches another button displayed on the display 12 of the image processing apparatus 1, instead of the display screen SA1 on the display section 101 of the portable information terminal 100a. In this case, in order to cause the image processing apparatus 1 to perform a desired function, the user may operate either the display 12 and the operation device 11 of the image processing apparatus 1 or the display screen on the display section 101 of the portable information terminal 100a. That is, there is no priority as to the order of acceptance of the functions between the display 12 and the operation device 11, and the display section 101 of the portable information terminal 100a.

Thus, in the image processing apparatus 1, the display 12 is capable of displaying a partial region of the virtual display screen IM1, which has an area exceeding the display area on the display 12. The portable information terminal 100a is capable of obtaining the positional relationship information indicating the relative positional relationship between the display 12 and the display section 101. In the portable information terminal 100a, the display section 101 is capable of displaying, based on the positional relationship information, another partial region of the virtual display screen IM1 that is un-overlapped or overlapped with the partial region displayed on the display 12. This ensures that another partial region of the virtual display screen IM1 that is too large to be displayed only on the display 12 can be displayed on the display section 101 as if the virtual display screen IM1 is extended. This, in turn, ensures a linkage between the image processing apparatus 1 and the portable information terminal 100a while creating an augmented sense of reality. It is accordingly ensured to provide an image processing system capable of simulatively enlarging the area of the display section by using the augmented sense of reality. It is possible to for the user to, for example, move the portable information terminal 100a over the virtual display screen IM1 so as to search for various kinds of operation functions. Additionally, the user can make an operation for a desired function to either the image processing apparatus 1 or the portable information terminal 100a.

Description will be made below with regard to how to obtain the positional relationship information indicating the relative positional relationship between the display 12 and the display section 101 of the portable information terminal 100a.

In the portable information terminal 100a, application software to implement the linked remote panel operation is installed in advance. When the user activates the application software, the photographing section 102 automatically starts real-time photographing of the display 12 of the image processing apparatus 1 and/or a situation in the vicinity of the display 12. The contents of the real-time photographing are displayed on the display section 101 of the portable information terminal 100a. Instead, the above-described another partial region of the virtual display screen IM1 is displayed on the display section 101 as the display screen SA1.

Here, in the image processing section 103 of the portable information terminal 100a, based on the image of the display 12 and/or the vicinity of the display 12 photographed by the photographing section 102, the image analysis section 103a determines a relative position of the display section 101 of the portable information terminal 100a with respect to the display 12 by image analysis so as to generate positional relationship information.

In the generation of the positional relationship information, the image analysis section 103a performs known image analysis using the panel vicinity data 103d so as to determine the relative positional relationship of the display section 101 of the portable information terminal 100a with respect to the display 12. The panel vicinity data 103d include various kinds of known data for image analysis. The data includes the shape, color, and characteristics of the display 12 and other devices in the vicinity of the display 12, such as the operation device 11 and the scanner device 13.

Thus, based on the image of the display 12 and/or the vicinity of the display 12 photographed by the photographing section 102, the image processing section 103 determines the relative position of the display section 101 with respect to the display 12 by image analysis so as to generate the positional relationship information. It is therefore ensured to provide an image processing system capable of simulatively enlarging the area of the display section only by providing the photographing section 102 and the image processing section 103 in the portable information terminal 100a. Thus, it is not necessary to provide a special device in the image processing apparatus 1.

In obtaining the positional relationship information, it is also possible to use a positional information signal measured and obtained externally in addition to or instead of the image analysis. Specifically, the image processing section 103 of the portable information terminal 100a includes a position measuring signal obtaining section capable of obtaining the positional information signal from outside and using the positional information signal for different purposes. The positional information signal is a signal indicating, for example, the direction, distance, and height of the portable information terminal 100 with respect to the image processing apparatus 1. The positional information signal is obtained, for example, upon establishment of communication between the portable information terminal 100 and the image processing apparatus 1 via wireless communication sections disposed at a plurality of portions of the image processing apparatus 1. Prior to the linked remote panel operation, a predetermined registration operation is performed by, for example, mounting the portable information terminal 100 on a center portion of the display 12. In this manner, apparatus positional information about the position of the display 12 is obtained in advance and stored in the position measuring position signal obtaining section. Then, based on the apparatus positional information and a positional information signal obtained in real time, the position measuring signal obtaining section may generate positional relationship information.

Thus, the portable information terminal 100a includes the position measuring signal obtaining section capable of obtaining the position measuring signal from outside, such as the positional information signal, so as to obtain in advance the apparatus positional information about the position of the display 12 of the image processing apparatus 1. The portable information terminal 100a generates positional relationship information based on the apparatus positional information and the positional information signal. Hence, it is ensured to provide an image processing system capable of simulatively enlarging the area of the display section only by using the position measuring signal obtaining section of the portable information terminal 100a to obtain in advance the apparatus positional information about the position of the display 12.

When the positional relationship information is generated using both the image analysis and the position measuring signal, it is possible to correct the positional relationship information depending on the accuracy of position measurement by the positional information signal in the position measuring signal obtaining section. Specifically, it is possible to correct the positional relationship information in consideration of the result of the positional information signal based on the positional relationship information obtained by the image analysis. Contrarily, it is possible to correct the positional relationship information in consideration of the result of the image analysis based on the positional relationship information obtained from the positional information signal.

The positional relationship information thus obtained is transmitted to the information display control section 103b of the image processing section 103. The information display control section 103b stores in advance, for example, full screen data of the virtual display screen IM1. Based on the positional relationship information from the image analysis section 103a and the position measuring signal obtaining section, the information display control section 103b causes the display section 101 to display a suitable portion of the virtual display screen IM1 as the display screen SA1. The display screen SA1 is displayed according to the relative positional relationship between the display 12 and the display section 101 to correspond to the display content of the display screen SB1 of the display 12, as if the virtual display screen IM1 is actually extended.

While in this embodiment the information display control section 103b obtains in advance the full screen data of the virtual display screen IM1, this should not be construed in a limiting sense. Another possible example is to obtain necessary data in the virtual display screen IM1 or the full screen data from the image processing apparatus 1 in real time by, for example, communication. In this case, the information sending/receiving section 103c of the image processing section 103 controls information receipt and forwards obtained information to the information display control section 103b. When the information display control section 103b has obtained in advance the full screen data of the virtual display screen IM1, it is possible to transmit a part of the virtual display screen IM1 to be displayed or the full screen data via the information sending/receiving section 103c by communication.

Figure 5:
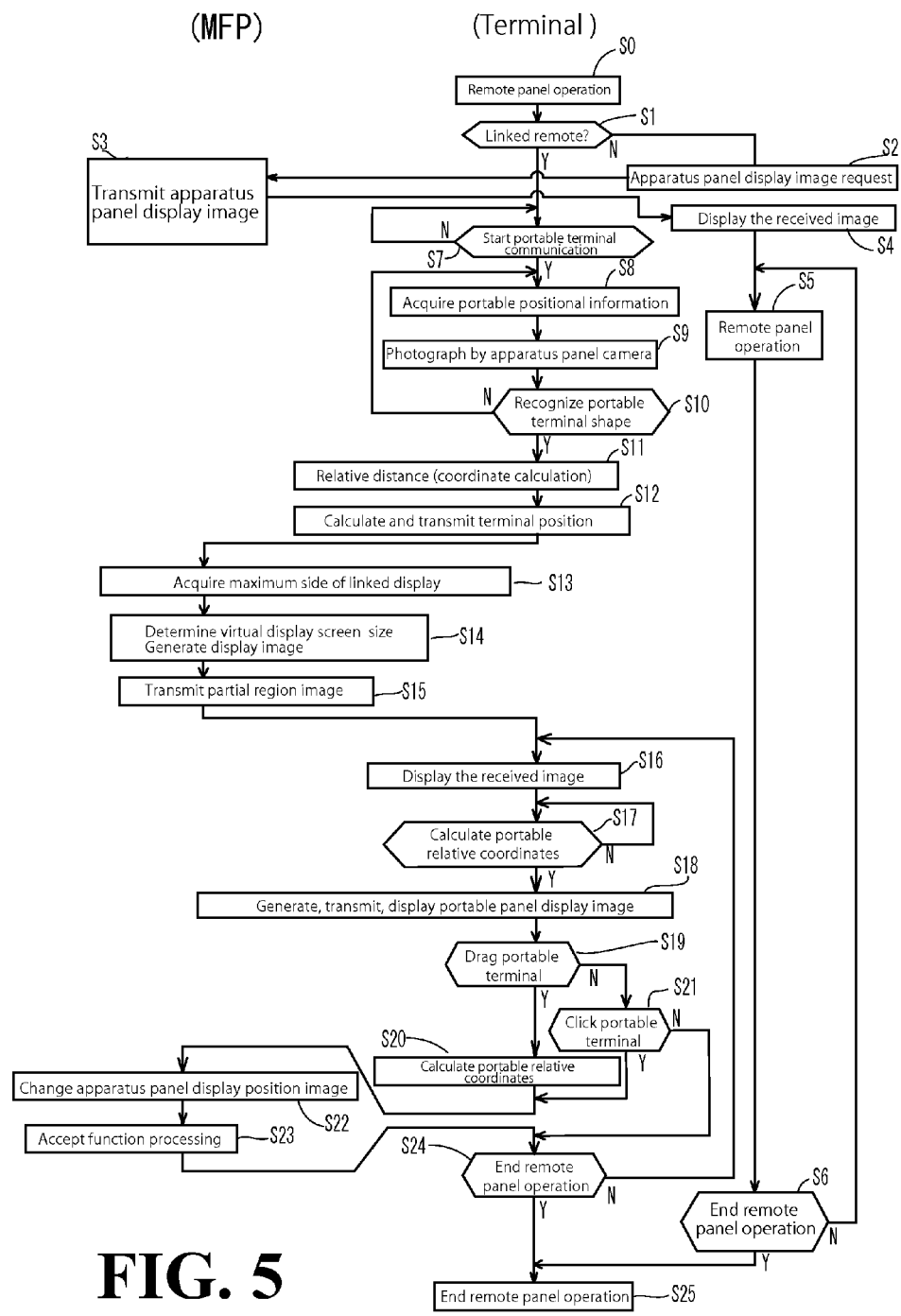
FIG. 5 is a flowchart illustrating processing performed by the portable information terminal and the image processing apparatus in the image processing system according to the first embodiment.

FIG. 5 is a flowchart illustrating processing performed by the portable information terminal 100a or 100b and the image processing apparatus 1 in the image processing system according to this embodiment, where a virtual display screen is an operation screen.

First, the user activates the application software to implement the linked remote panel operation installed in advance in the portable information terminal 100a or 100b. Via the application software, the start of the remote panel operation is instructed (step S0).

Next, a determination is made as to whether the linked remote panel operation or the sole remote panel operation has been selected (step S1). When the sole remote panel operation is selected, the portable information terminal 100a or 100b makes a request for a display image on the display 12 to the image processing apparatus 1 (step S2). Upon acceptance of the request from the portable information terminal 100a or 100b, the image processing apparatus 1 transmits the display image on the display 12 (step S3). Upon receipt of the display image from the image processing apparatus 1, the portable information terminal 100a or 100b causes the display section 101 to display the received display image (step S4).

Thus, the display section 101 of the portable information terminal 100a or 100b simply displays an identical display screen to the display screen on the display 12 of the image processing apparatus 1. Here, the operation on the display section 101 of the portable information terminal 100a or 100b is given priority over the operation on the display 12 of the image processing apparatus 1 (step S5). Then, a determination is made as to whether termination of the sole remote panel operation has been instructed (step S6). When no instruction for termination is made yet, the procedure returns to step S2. When an instruction for termination is made, the remote panel operation is terminated (step S25).

Upon selection of the linked remote panel operation, the portable information terminal 100a or 100b determines whether starting communication with the image processing apparatus 1 is possible (step S7). When starting communication is not possible, the procedure returns to step S4 and remains in standby state until starting communication becomes possible. When starting communication is possible, the positional information processing section 103e obtains a positional information signal (step S8). Then, the photographing section 102 automatically starts real-time photographing of the display 12 of the image processing apparatus 1 and/or the situation in the vicinity of the display 12 (step S9).

Based on the image of the display 12 and/or the situation in the vicinity of the display 12 photographed by the photographing section 102, the image analysis section 103a determines whether the shape of the display 12 and/or the vicinity of the display 12 is recognized (step S10). When these shapes are not yet recognized, the procedure returns to step S8, where the positional information processing section 103e obtains the positional information signal again, and the photographing section 102 performs photographing again.

When the shape of the display 12 and/or the vicinity of the display 12 has been recognized, the image analysis section 103a determines a relative position of the display section 101 of the portable information terminal 100a or 100b with respect to the display 12 by known image analysis using the panel vicinity data 103d so as to generate positional relationship information. Specifically, the image analysis section 103a calculates, for example, a relative distance between the display section 101 of the portable information terminal 100a and the display 12, and their respective directions and coordinates (step S11). The portable information terminal 100a or 100b transmits to the image processing apparatus 1 the relative distance, directions and coordinates calculated at step S11 together with a screen size of the display section 101 (step S12).

Based on the information transmitted from the portable information terminal 100a or 100b, the image processing apparatus 1 determines a position of the portable information terminal 100a or 100b, and recognizes the screen size of the display section 101. From these results, the image processing apparatus 1 calculates a length of a maximum side of the virtual display screen IM1 or IM2 (step S13), and determines a screen size of a part of the virtual display screen IM1 or IM2 to be displayed on the display section 101 of the portable information terminal 100a or 100b so as to generate an image (partial region image) to be displayed on the display section 101 (step S14). Then, the image processing apparatus 1 transmits the image (partial region image) generated by cutting out the part of the virtual display screen IM1 or IM2 at step S14 (step S15). The portable information terminal 100a or 100b receives the partial region image and causes the display section 101 to display the partial region image (step S16).

When the portable information terminal 100a or 100b is moved afterward, a determination is made as to whether relative coordinates associated with the movement are already calculated (step S17). When the relative coordinates are not calculated yet, the procedure returns to step S17 and waits for calculation. When the relative coordinates are already calculated, a part of the virtual display screen IM1 or IM2 to be displayed on the display section 101 of the portable information terminal 100a or 100b is generated on the display section 101 (step S18).

Subsequently, a determination is made as to whether a drag operation has been performed on the portable information terminal 100a or 100b (step S19). When the drag operation is performed, relative coordinates of the portable information terminal 100a after being moved by dragging are calculated (step S20). When no drag operation is performed, a determination is made as to whether a click operation (including a double-click operation) has been performed (step S21). When the click operation is performed, the image processing apparatus 1 accordingly performs processing for changing a display position and the content on a display screen (step S22), and accepts functional processing for, for example, shifting the position of an apparatus onscreen operation region AR (step S23).

Then, a determination is made as to whether the termination of the linked remote panel operation has been instructed (step S24). When no instruction for termination is made yet, the procedure returns to step S16. When an instruction for termination is made, the linked remote panel operation is terminated (step S25).

Figure 6B:
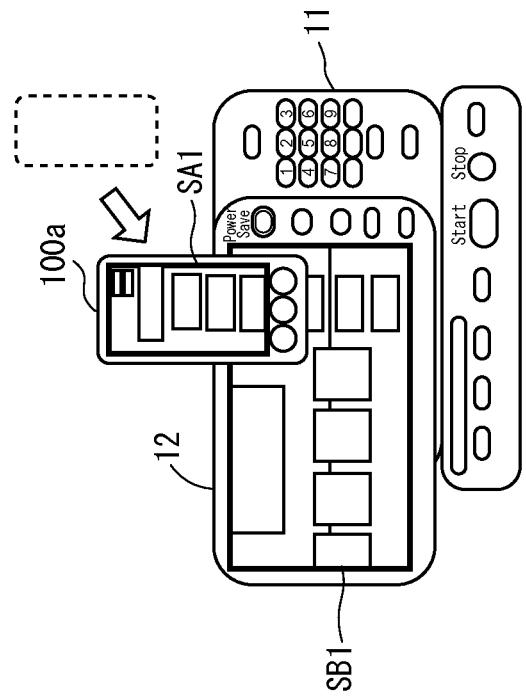
FIGS. 6A and 6B are diagrams illustrating other examples of the linked remote panel operation.
Figure 6A:
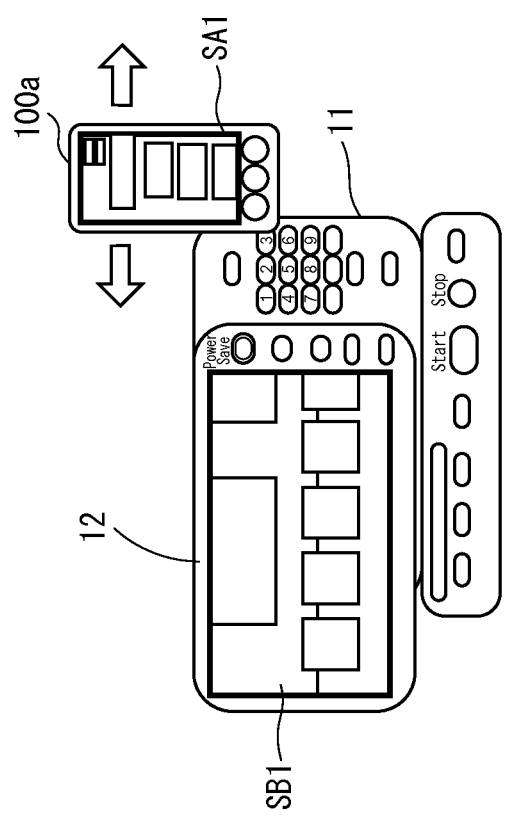

FIGS. 6A and 6B are diagrams illustrating examples of the linked remote panel operation. FIG. 6A illustrates a case where the user moves the portable information terminal 100a without performing any operation to the display section 101, that is, a case where a change has occurred in the relative positional relationship of the display section 101 of the portable information terminal 100a with respect to the display 12 of the image processing apparatus 1 (NO at both steps S19 and S21). In this case, the positional relationship information from the image analysis section 103a and/or the positional information processing section 103e is updated into new positional relationship information. Based on the updated positional relationship information, the portable information terminal 100a changes the display screen SA1 of the display section 101. Specifically, the portable information terminal 100a causes the display section 101 to display a suitable portion of the virtual display screen IM1 at the new position of the portable information terminal 100a.

FIG. 6B illustrates a case where the user moves the portable information terminal 100a while dragging with the user's finger touching the display section 101, that is, a case where an operation to the portable information terminal 100a has been performed and a change has occurred in the relative positional relationship of the display section 101 of the portable information terminal 100a with respect to the display 12 of the image processing apparatus 1 (YES at step S19).

In this case, the content of the operation (dragging) is detected in the portable information terminal 100a, and the positional relationship information is updated. The dragging is still continued on the portable information terminal 100a, and hence the portable information terminal 100a does not change the display screen SA1 on the display section 101. The display content for the display screen SB1 of the display 12 of the image processing apparatus 1 is changed in conjunction with the movement of the portable information terminal 100a on which dragging continues. That is, based on the content of the operation (drag) and the updated positional relationship information, the portable information terminal 100a communicates with the image processing apparatus 1 so as to change the display content for the display 12 in the image processing apparatus 1. Specifically, the portable information terminal 100a causes the display 12 to display a suitable portion of the virtual display screen IM1 at the new position of the portable information terminal 100a.

Although not elaborated in the diagrams, when the user slides the user's finger on the display section 101 so as to move (flick) the content on the display screen SA1 without moving the position of the portable information terminal 100a, that is, upon occurrence of an operation to the portable information terminal 100a, then based on the content of the operation (flicking), the portable information terminal 100a is capable of changing the display content for the display section 101, and is also capable of communicating with the image processing apparatus 1 so as to change the display content for the display 12 in the image processing apparatus 1. Specifically, the portable information terminal 100a moves the virtual display screen IM1 by an amount equal to the movement of the display content of the display 12 by the flick operation and displays the resulting virtual display screen IM1 on the display 12.

When, although not elaborated in the diagrams either, the user slides the user's finger on the display 12 so as to move (flick) the content of the display screen SB1 without moving the position of the portable information terminal 100a, that is, upon occurrence of an operation to the image processing apparatus 1, then based on the content of the operation (flicking), the image processing apparatus 1 is capable of changing the display content for the display 12 and communicating with the portable information terminal 100a so as to change the display content of the display section 101 in the portable information terminal 100a. Specifically, the virtual display screen IM1 is moved by an amount equal to the movement of the display content of the display 12 by the flick operation and is displayed on the display section 101.

For example, when the user performs an operation of double-clicking (two quick finger touches) on a location other than the buttons on the display section 101 without moving the position of the portable information terminal 100a (YES at step S21), that is, upon occurrence of an operation to the portable information terminal 100a, then based on the content of the operation (double-clicking), the portable information terminal 100a may communicate with the image processing apparatus 1 so as to implement centering of the display content (displaying a middle portion of the virtual display screen IM1) in the image processing apparatus 1, or so as to display on the display 12 a content identical to the content on the display section 101 of the portable information terminal 100a.

Figure 7:
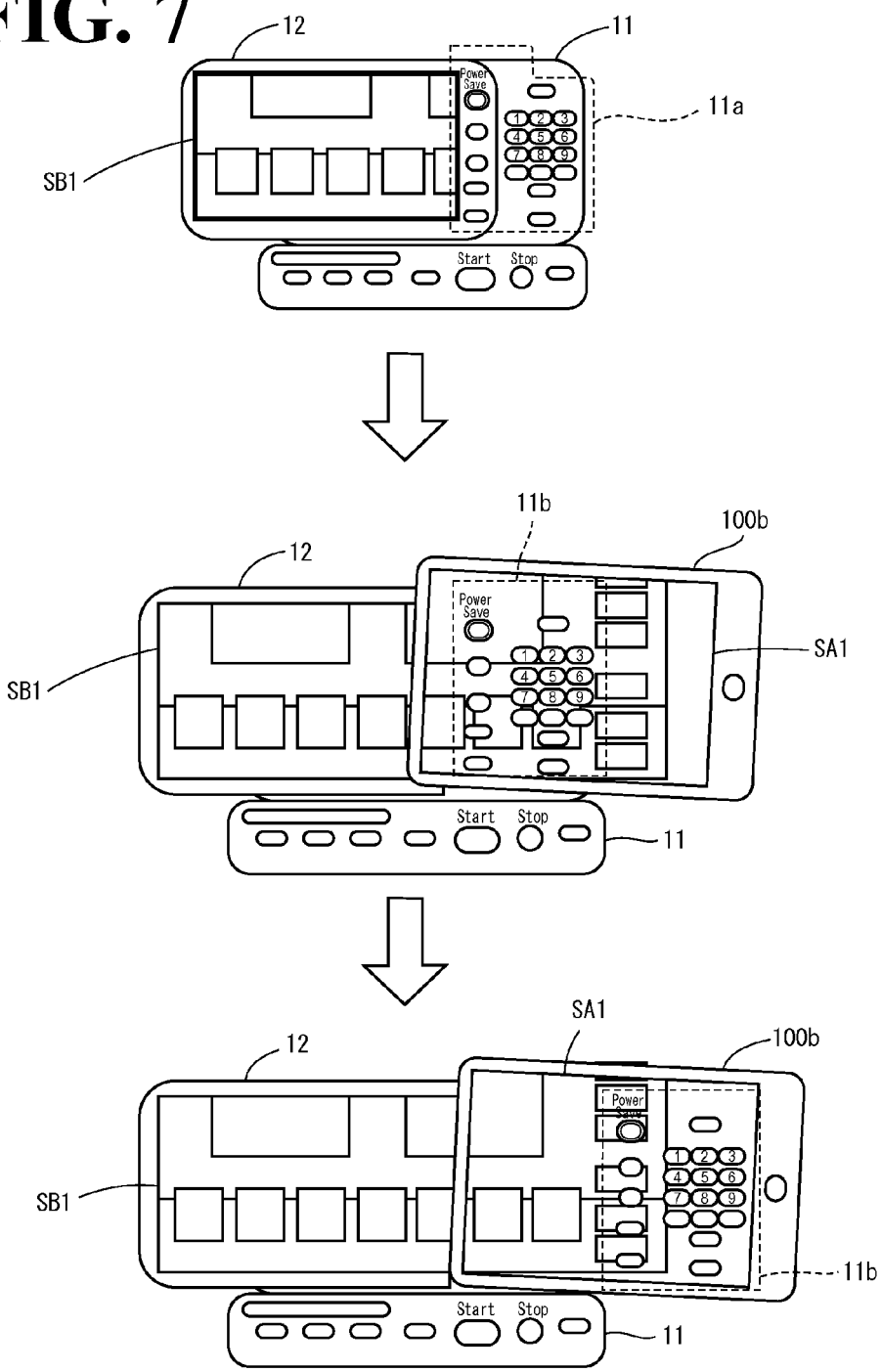
FIG. 7 shows diagrams illustrating other examples of the linked remote panel operation.

FIG. 7 is a diagram illustrating other examples of the linked remote panel operation. Instead of the portable information terminal 100a, which is a smartphone or a similar device, FIG. 7 shows the portable information terminal 100b. The portable information terminal 100b is a tablet terminal having a larger display screen than the portable information terminal 100a. The portable information terminal 100b has a similar configuration to the configuration shown in FIG. 3.

The portable information terminal 100b, which is a tablet terminal, is also capable of performing the linked remote panel operation, similarly to the portable information terminal 100a, which is a smartphone or a similar device. Since, however, the portable information terminal 100b is larger in size, an operation region for physical keys for the operation device 11 of the image processing apparatus 1 (for example, a region 11a indicated by a broken line on the upper stage of FIG. 7) may be concealed behind the portable information terminal 100b.

In view of this, as shown on the middle or lower stage of FIG. 7, when the operation device 11 is concealed behind the portable information terminal 100b due to a relative positional relationship of the display section 101 of the portable information terminal 100b with respect to the display 12, a terminal onscreen operation region 11b resembling the operation device 11 is displayed on the display screen SA1 of the display section 101. The user may operate the terminal onscreen operation region 11b to operate the image processing apparatus 1 via communication.

The middle stage and the lower stage of FIG. 7 differ from each other in display position within the display screen SA1 of the terminal onscreen operation region 11b. When other buttons and the terminal onscreen operation region 11b are overlapped within the display screen SA1, making the display screen SA1 difficult to see, then the terminal onscreen operation region 11b may be automatically moved to an edge portion of the display screen SA1. This makes the terminal onscreen operation region 11b easier to see.

The portable information terminal 100b obtains in advance information about the position of the operation device 11, and stores the information in, for example, the panel vicinity data 103d. This enables the information display control section 103b to make a determination as to whether the operation device 11 is concealed behind the portable information terminal 100b due to the relative positional relationship of the display section 101 of the portable information terminal 100b with respect to the display 12. Specifically, the information display control section 103b makes this determination by comparing information about the position of the operation device 11, such as coordinates, with information about the display section 101 of the portable information terminal 100b, such as coordinates.

Thus, when the operation device 11 of the image processing apparatus 1 is concealed behind the portable information terminal 100b due to the relative positional relationship of the display section 101 of the portable information terminal 100b with respect to the display 12, the portable information terminal 100b causes the display section 101 to display the terminal onscreen operation region 11b resembling the operation device 11 and enabling the operation to the image processing apparatus 1 via communication. Consequently, even when the operation device 11 is concealed behind the portable information terminal 100b, the user is able to continue the operation to the image processing apparatus 1 through the terminal onscreen operation region 11b displayed on the display section 101 of the portable information terminal 100b.

While the description with reference to FIG. 7 is concerning the portable information terminal 100b, which is a tablet terminal larger in display size, a similar problem can occur when using the portable information terminal 100a, which is a smartphone or a similar device. In view of this, the portable information terminal 100a may be similar to the portable information terminal 100b in that the terminal onscreen operation region 11b resembling the operation device 11 may be displayed on the display screen of the display section 101.

Figure 21A:
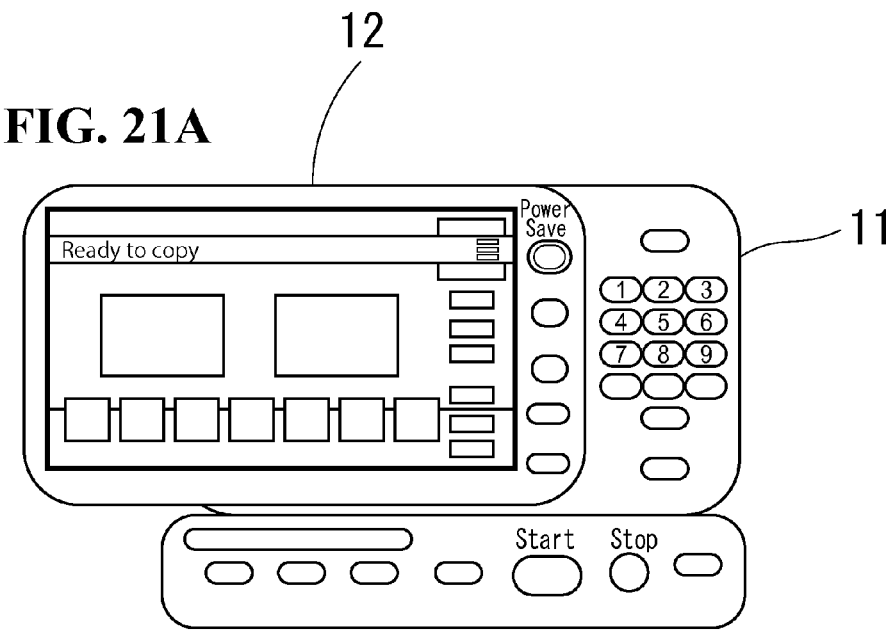
FIGS. 21A and 21B are diagrams illustrating display screens according to a conventional image processing apparatus.
Figure 21B:
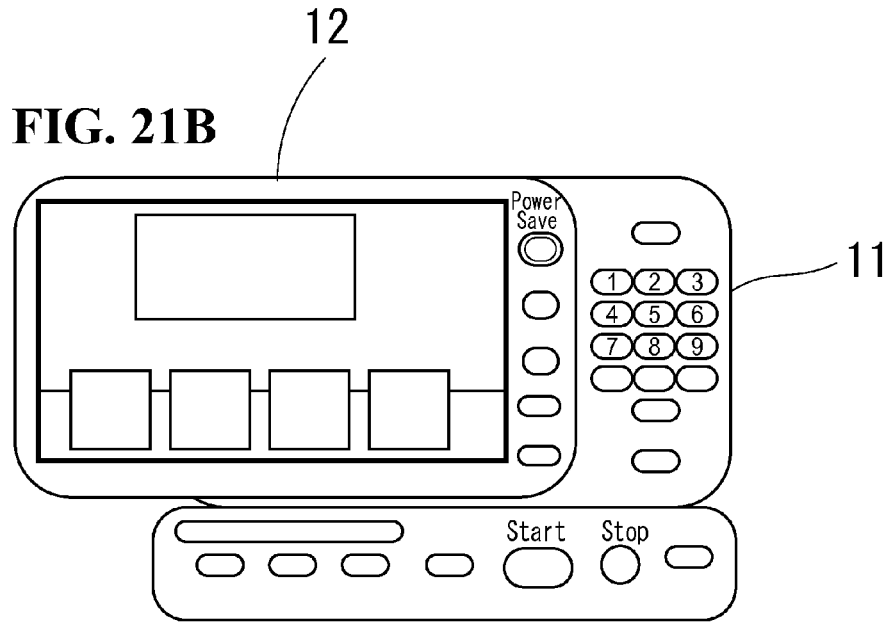
Figure 22A:
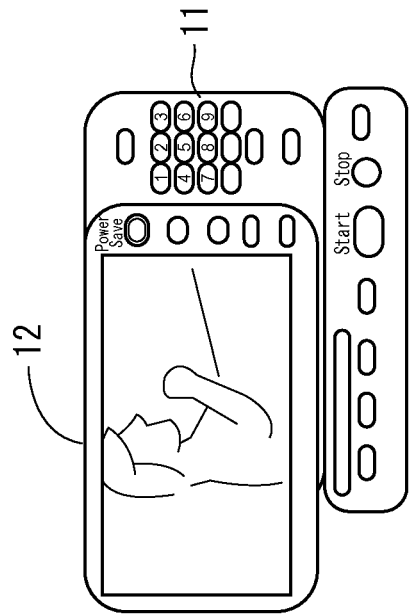
FIGS. 22A and 22B are diagrams illustrating other display screens according to the conventional image processing apparatus.
Figure 22B:
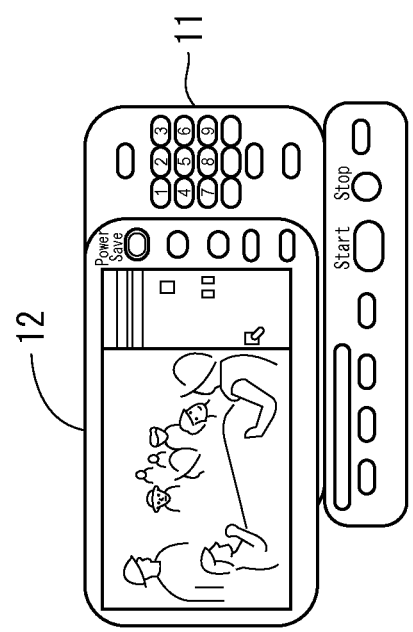

In the above description, the virtual display screen IM1 is exemplified as a general operation screen on which a large number of various kinds of buttons are arranged to implement multiple functions. Here, as described in the DISCUSSION OF THE BACKGROUND section, FIG. 21B employs a configuration in which after one of the buttons is pressed, a lower hierarchy level screen appears to show a plurality of options corresponding to the button, and one of buttons corresponding to the options is then pressed. In some cases, however, this configuration does not directly lead to a decrease in the number of pressing times of the buttons.

In view of this, it is possible to employ a virtual display screen that incorporates all the upper hierarchy level and the lower hierarchy level within the screen. Although it has been difficult for conventional image processing apparatuses to implement an operation screen incorporating all the hierarchy levels within a screen, the configuration according to this embodiment realizes such operation screen, since the display section can be simulatively enlarged.

Figure 8A:
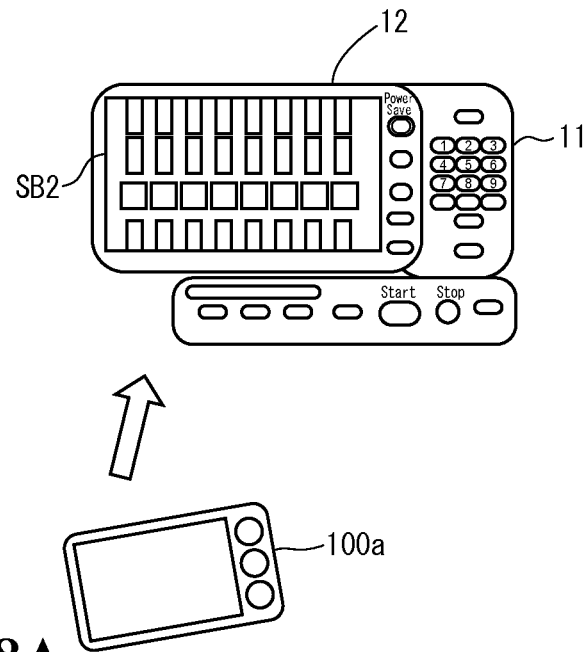
FIGS. 8A and 8B are diagrams describing a case where a virtual display screen showing an operation screen incorporating all hierarchy levels within a screen is displayed on a display of the image processing apparatus and a display section of the portable information terminal.
Figure 8B:
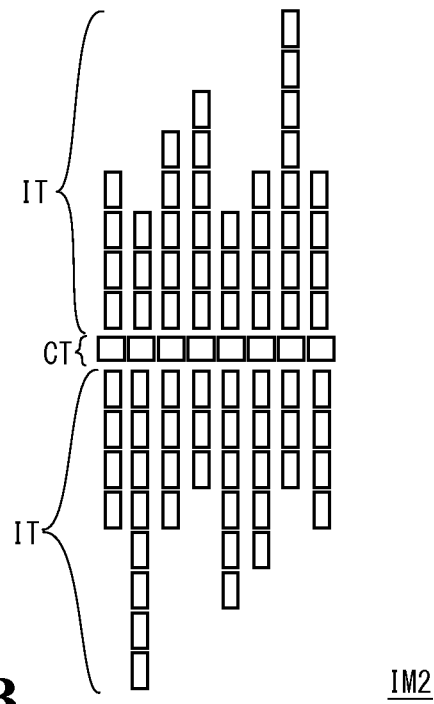

FIGS. 8A and 8B are diagrams describing a case where the display 12 and the display section 101 of the portable information terminal 100a display a virtual display screen IM2 showing the operation screen incorporating all hierarchy levels within the screen. Specifically, FIG. 8A shows a situation in which the portable information terminal 100a is brought to a vicinity of the circumference of the display 12 of the image processing apparatus 1. FIG. 8B shows a configuration of the virtual display screen IM2.

FIG. 8A shows a state in which the display 12 of the image processing apparatus 1 displays a display screen SB2. The display screen SB2 shows a partial region of the virtual display screen IM2 having an area exceeding the display area on the display 12. Although not elaborated in FIG. 8A, the display section 101 of the portable information terminal 100a displays another partial region of the virtual display screen IM2 that is un-overlapped with or partially or entirely overlapped with the display screen SB2 displayed on the display 12.

As shown in FIG. 8B, on the virtual display screen IM2, a large number of items CT indicating various kinds of functions to implement multiple functions (portions respectively indicated by squares in FIG. 8B) are horizontally arranged side by side in a middle portion of the virtual display screen IM2. A large number of option items IT respectively correspond to the items CT, which indicate the various kinds of functions, and are vertically arranged in vertical rows over and below the middle portion.

Similarly to the cases with FIGS. 4 to 7, the cases with FIGS. 8A and 8B ensure a linkage between the image processing apparatus 1 and the portable information terminal 100a so as to implement various kinds of functions, such as a search for the items on the virtual display screen IM2 by movement of the portable information terminal 100a, and interlocking of a display content based on the operation to either of the display screens.

Figure 9A:
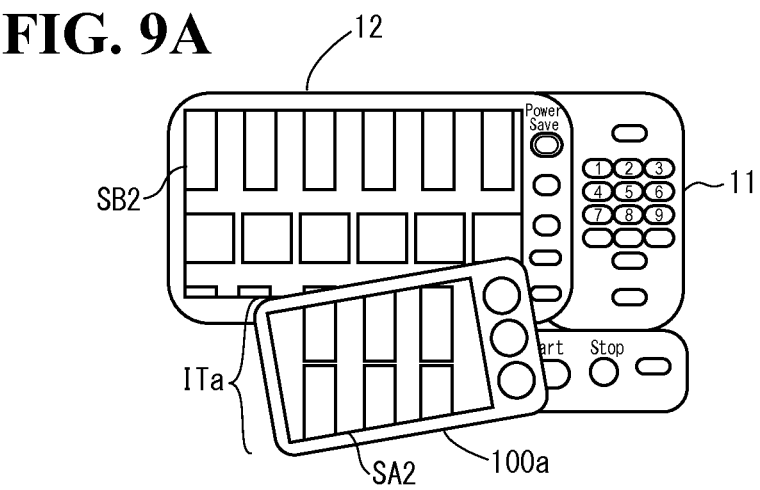
FIGS. 9A and 9B are diagrams illustrating other examples of the linked remote panel operation.
Figure 9B:
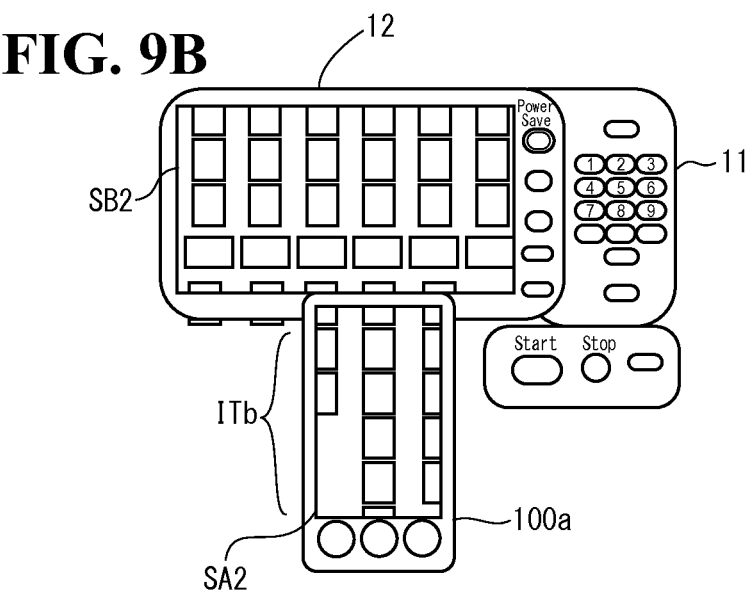

FIGS. 9A and 9B are diagrams illustrating other examples of the linked remote panel operation. FIG. 9A shows a state in which the user brings the portable information terminal 100a to a vicinity of the display 12 of the image processing apparatus 1 by orienting the long length direction of the display section 101 of the portable information terminal 100a to the long length direction of the display 12 of the image processing apparatus 1 so that both long length directions are approximately identical to each other, with a slight deviation.

Consequently, the display 12 displays a display screen SB2. The display screen SB2 shows a partial region of the virtual display screen IM2 having an area exceeding the display area. The display section 101 of the portable information terminal 100a obtains positional relationship information indicating the relative positional relationship between the display 12 and the display section 101. Based on the positional relationship information, the display section 101 displays a display screen SA2. The display screen SA2 shows another partial region of the virtual display screen that is partially overlapped with the partial region displayed on the display 12.

The display screen SB2 displays the items CT, which indicate various kinds of functions, and part of the upper stage of the option items IT, which respectively correspond to the items CT, which indicate various kinds of functions. The display screen SA2 displays the option items IT on the lower stage in an oblong display form ITa.

FIG. 9B shows a state in which the portable information terminal 100a is disposed so that, as compared with the case with FIG. 9A, a change in relative angle is provided in the long length direction of the display section 101 of the portable information terminal 100a with respect to the long length direction of the display 12 of the image processing apparatus 1, that is, the long length direction of the display section 101 is oriented at approximately right angles with respect to the long length direction of the display 12.

FIG. 9B is similar to FIG. 9A in that the display screen SB2 displays the items CT, which indicate various kinds of functions, and part of the upper stage of the option items IT, which respectively correspond to the items CT, which indicate various kinds of functions. The option items IT, however, are displayed in a slightly vertically compressed manner so as to display a larger number of the option items IT than the number of the option items IT shown in FIG. 9A. Similarly, the display screen SA2 displays the option items IT on the lower stage in a slightly compressed display form ITb.

That is, a change in the relative angle in the long length direction of the display section 101 with respect to the long length direction of the display 12 of the image processing apparatus 1 is included in the change in the positional relationship of the display section 101 of the portable information terminal 100a with respect to the display 12. Based on the change in the relative angle, the portable information terminal 100a communicates with the image processing apparatus 1 so as to change the display content of the display 12 and/or change the display content of the display section 101.

With this configuration, when the portable information terminal 100a is disposed with the long length direction of the display section 101 oriented at approximately right angles with respect to the long length direction of the display 12 as shown in FIG. 9B, this orientation is determined as the user's intention of recognizing the entire contents of the option items IT. In this case, as many option items IT as possible are displayed in the compressed display form ITb. When the portable information terminal 100a is disposed with the long length direction of the display section 101 oriented in the approximately identical direction to the long length direction of the display 12 as shown in FIG. 9A, this orientation is determined as absence of the above-described intention of the user. In this case, the option items IT are displayed in the oblong display form ITa, which is a usual manner (the contents of the items IT are indicated using, for example, characters, which makes the items IT easier to see). Thus, a change in the relative angle between the long length direction of the display 12 and the long length direction of the display section 101 can also be used as a basis, and this further enhances the linkage between the image processing apparatus 1 and the portable information terminal 100a.

The "long length" direction in the foregoing description may be replaced with "short length" direction.

FIGS. 10A to 10C are diagrams illustrating other examples of the linked remote panel operation. FIG. 10A shows a state in which the display 12 of the image processing apparatus 1 displays a display screen SB2. The display screen SB2 shows a partial region of the virtual display screen IM2 having an area exceeding the display area on the display 12. The display section 101 of the portable information terminal 100a displays a display screen SA2. The display screen SA2 shows another partial region of the virtual display screen IM2 that is un-overlapped with the display screen SB2 displayed on the display 12. Depending on the relative positional relationship between the display 12 and the display section 101, the display section 101 of the portable information terminal 100a may show, as the display screen SA2, still another partial region of the virtual display screen IM2 that is partially or entirely overlapped with the display screen SB2 displayed on the display 12.

FIG. 10B shows a case where after the user has moved the position of the portable information terminal 100a and founded a desired option item IT, the user performs a double-click operation on the option item IT on the display section 101 (double-clicking is indicated by reference character CR in FIG. 10B). Here, based on the content of the operation (double-clicking), the portable information terminal 100a communicates with the image processing apparatus 1 so as to cause the image processing apparatus 1 to display, as the display screen SB2 for the display 12, an approximately identical content to the content on the display section 101 of the portable information terminal 100a. That is, the content (the desired option items IT) selected through the display section 101 is subjected to centering on the display screen SB2 of the display 12.

Alternatively, it is possible to display, as the display screen SB2 of the display 12, an approximately identical content to the content on the display section 101 of the portable information terminal 100a in the following manner. After the user has double-clicked on the option item IT on the display section 101, the user keeps clicking on the option item IT and moves the portable information terminal 100a to a position over the display 12 of the image processing apparatus 1. Then, the user releases the clicking by separating the user's finger off the option item IT. This state is shown in FIG. 10C. Also in this case, the content (the desired option item IT) selected through the display section 101 can be subjected to centering on the display screen SB2 of the display 12.

Figures 11A, 11B:
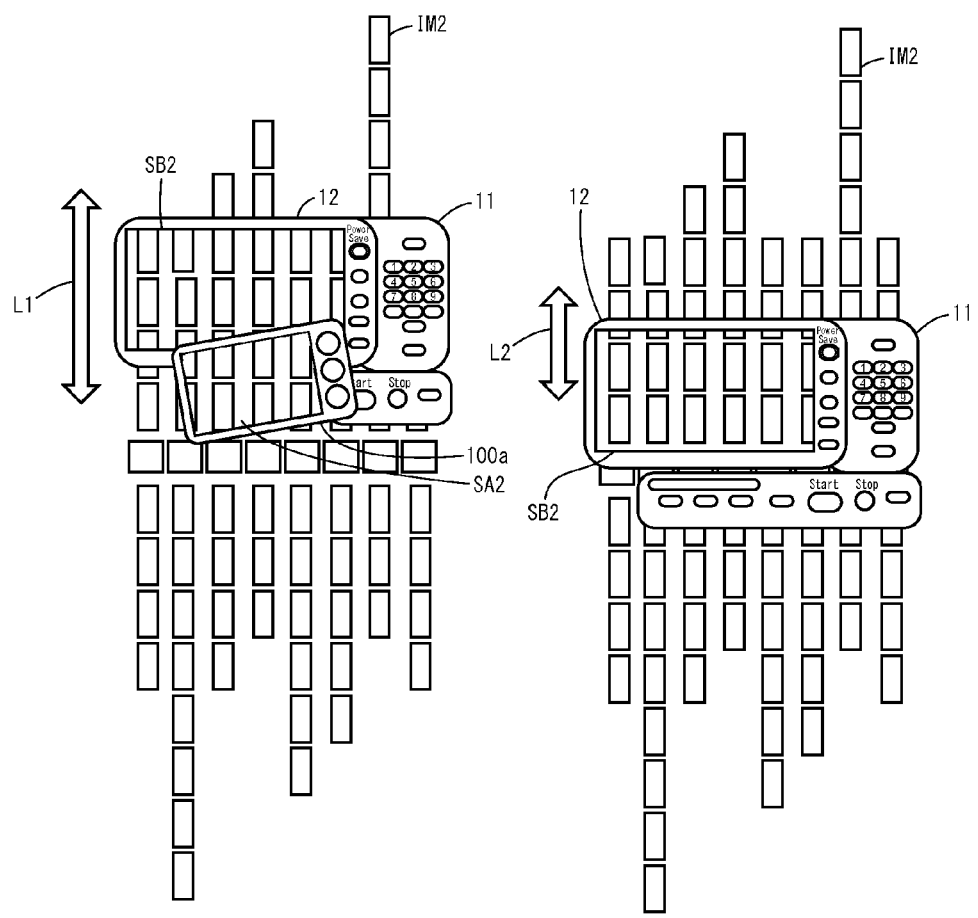
FIGS. 11A and 11B are diagrams illustrating other examples of the linked remote panel operation.

FIGS. 11A and 11B are diagrams illustrating other examples of the linked remote panel operation. The display 12 and the display section 101 each have the touch screen function as described above (which, however, should not be construed as excluding the case where only one of the display 12 and the display section 101 has the touch screen function, while the other is without the touch screen function). The touch screen function includes a flick operation of scrolling the display content by moving and flicking the display screen while keeping the user's finger or another object (for example, a stylus pen) in contact with the display screen.

The speed of scrolling by the flick operation may vary between the display 12 and the display section 101 according to the relative positional relationship between the display 12 and the display section 101. FIGS. 11A and 11B are diagrams describing this respect.

FIG. 11A shows a case where the display section 101 of the portable information terminal 100a is disposed adjacent to the lower side of the display 12. FIG. 11B shows a case where the portable information terminal 100a is not brought to a vicinity of the display 12 and no linked remote operation is to be performed, or a case where the portable information terminal 100a is disposed at a position spaced apart from the vicinity of the display 12 (that is, a case where the portable information terminal 100a is so far away from the display 12 that it is difficult to say that the display region of the display 12 is directly extended).

In the case shown in FIG. 11A, the display region is simulatively extended in the direction in which the portable information terminal 100a is disposed, as indicated by the length of arrow L1. In the case shown in FIG. 11B, the display region of the display 12 alone is used, and thus as shown by the length of arrow L2, the vertical length of the display region is shorter than the length of the arrow L1.

In general, during the flick operation, it is necessary to impose a restriction on the onscreen movement distance in accordance with the limit of a scrollable range. In view of this, for example, when the display region is narrow, it is possible to set the scrolling speed higher so as to make it easier to reach the limit of the scrollable range. When the display region is large, in which case it is faster to reach the limit of the scrollable range, it is possible to set the scrolling speed lower.

Thus, when the display region is simulatively extended in the direction in which the portable information terminal 100a is disposed as in the case with FIG. 11A, it is possible to set the vertical scrolling speed lower. This ensures a slower flow of the individual option items IT when displayed, and improves operability. When the display region of the display 12 is not extended as in the case with FIG. 11B, the vertical scrolling speed can be set higher to ensure earlier recognition of the limit of the scrollable range.

Thus, the display 12 and/or the display section 101 have the touch screen function to permit the flick operation of scrolling the display content by moving and flicking the display screen while keeping the user's finger or another object in contact with the display screen. The display 12 and/or the display section 101 change the respective scrolling speeds according to the relative positional relationship between the display 12 and the display section. This configuration improves the operability of the display section.

When the display region of the display 12 is simulatively extended, the vertical scrolling speed may be increased, while when the display region of the display 12 is not simulatively extended, the vertical scrolling speed may be set lower, which is contrary to the above-described configuration. This is based on such a design concept that when the display region of the display 12 is simulatively extended, the number of simultaneously visible option items IT is increased, and thus the increased scrolling speed would cause no or minimal inconvenient situation.

In either case, it is possible to vary the scrolling speed depending on whether the display region of the display 12 is simulatively extended. This improves the operability of the display section.

Figure 12:
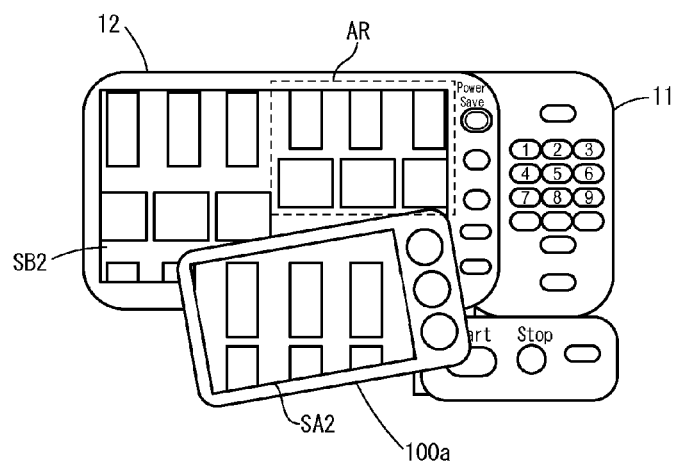
FIG. 12 is a diagram illustrating another example of the linked remote panel operation.

FIG. 12 is a diagram showing another linked remote panel operation. FIG. 12 shows a case where a part of the display 12 of the image processing apparatus 1 is concealed behind the portable information terminal 100a. Assume that the concealed part of the display 12 contains the apparatus onscreen operation region AR, which is used to operate the image processing apparatus 1.

When the apparatus onscreen operation region AR is concealed behind the portable information terminal 100a due to the relative positional relationship of the display section 101 of the portable information terminal 100a with respect to the display 12, the image processing apparatus 1 shifts the apparatus onscreen operation region AR on the display 12 so as to change the display content so that the apparatus onscreen operation region AR may not be concealed behind the portable information terminal 100a.

For this processing, the image processing apparatus 1 obtains in advance information about the position of the apparatus onscreen operation region AR, such as coordinates. Also, in order to recognize the position of the portable information terminal 100a, the image processing apparatus 1 obtains, from the portable information terminal 100a via communication, positional relationship information indicating a relative positional relationship between the display 12 and the display section 101 of the portable information terminal 100a. Then, the image processing apparatus 1 determines whether the apparatus onscreen operation region AR is concealed behind the portable information terminal 100a due to the relative positional relationship of the display section 101 of the portable information terminal 100a with respect to the display 12. Specifically, the image processing apparatus 1 makes this determination by comparing the information about the position of the apparatus onscreen operation region AR, such as coordinates, with the information about the display section 101 of the portable information terminal 100a, such as coordinates.

Thus, when the apparatus onscreen operation region AR is concealed behind the portable information terminal 100a due to the relative positional relationship of the display section 101 of the portable information terminal 100a with respect to the display 12, the image processing apparatus 1 shifts the apparatus onscreen operation region AR on the display 12 so as to change the display content as shown in FIG. 12 so that the apparatus onscreen operation region AR may not be concealed behind the portable information terminal 100a.

Thus, when the apparatus onscreen operation region AR is concealed behind the portable information terminal 100a due to the relative positional relationship of the display section 101 of the portable information terminal 100a with respect to the display 12, the image processing apparatus 1 shifts the apparatus onscreen operation region AR on the display 12 so as to change the display content so that the apparatus onscreen operation region AR may not be concealed behind the portable information terminal 100a. Consequently, even when the apparatus onscreen operation region AR is concealed behind the portable information terminal 100a, the apparatus onscreen operation region AR is shifted so that an updated apparatus onscreen operation region AR is displayed. This ensures a continued operation to the image processing apparatus 1.

Figure 13:
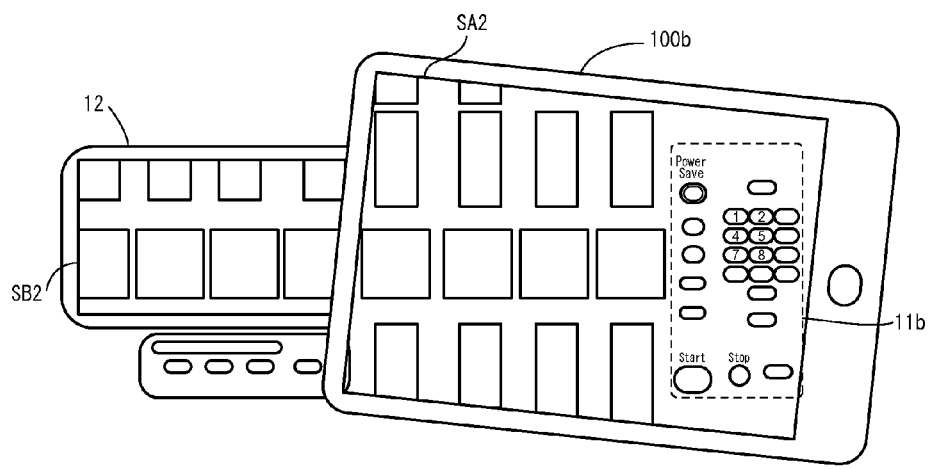
FIG. 13 is a diagram illustrating another example of the linked remote panel operation.

FIG. 13 is a diagram illustrating another example of the linked remote panel operation. FIG. 13 is similar to FIG. 7 in that FIG. 13 shows the portable information terminal 100b instead of the portable information terminal 100a, which is a smartphone or a similar device. The portable information terminal 100b is a tablet terminal having a larger display screen than the portable information terminal 100a. The operation region of the operation device 11 of the image processing apparatus 1 is concealed behind the portable information terminal 100b.

Similarly to the case with FIG. 7, the terminal onscreen operation region 11b resembling the operation device 11 may be displayed on the display screen SA2 of the display section 101, and the user may perform an operation through the terminal onscreen operation region 11b so as to make the image processing apparatus 1 operable via communication.

<Second Embodiment>

This embodiment is a modification of the image processing system according to the first embodiment. Specifically, this embodiment uses a virtual display screen not as an operation screen but as, for example, print preview data of an image to be subjected to printing, after the data has been read by the scanner device 13 included in the image processing apparatus 1, or has been transferred from an external PC or another external device.

Figure 14A:
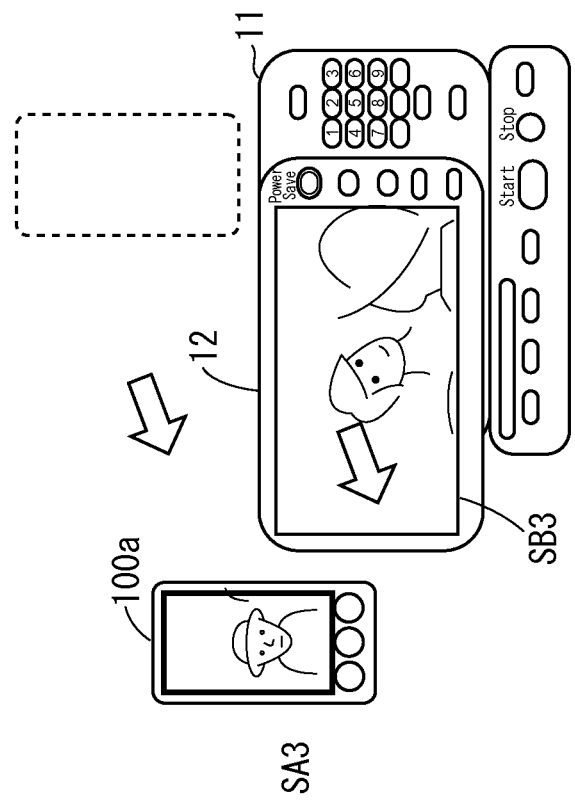
FIGS. 14A and 14B are diagrams illustrating a linked remote panel operation in an image processing system according to a second embodiment of the present invention.
Figure 14B:
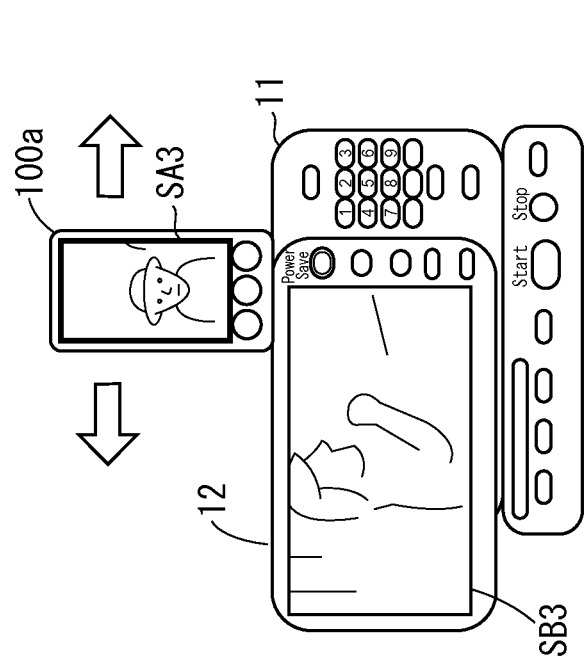

FIGS. 14A and 14B are diagrams illustrating other examples of the linked remote panel operation. FIGS. 14A and 14B respectively correspond to FIGS. 6A and 6B, and show movement of the portable information terminal 100a, and movement of the portable information terminal 100a while dragging on the display section 101. The advantageous effects are similar to the advantageous effects in FIGS. 6A and 6B.

Figure 15:
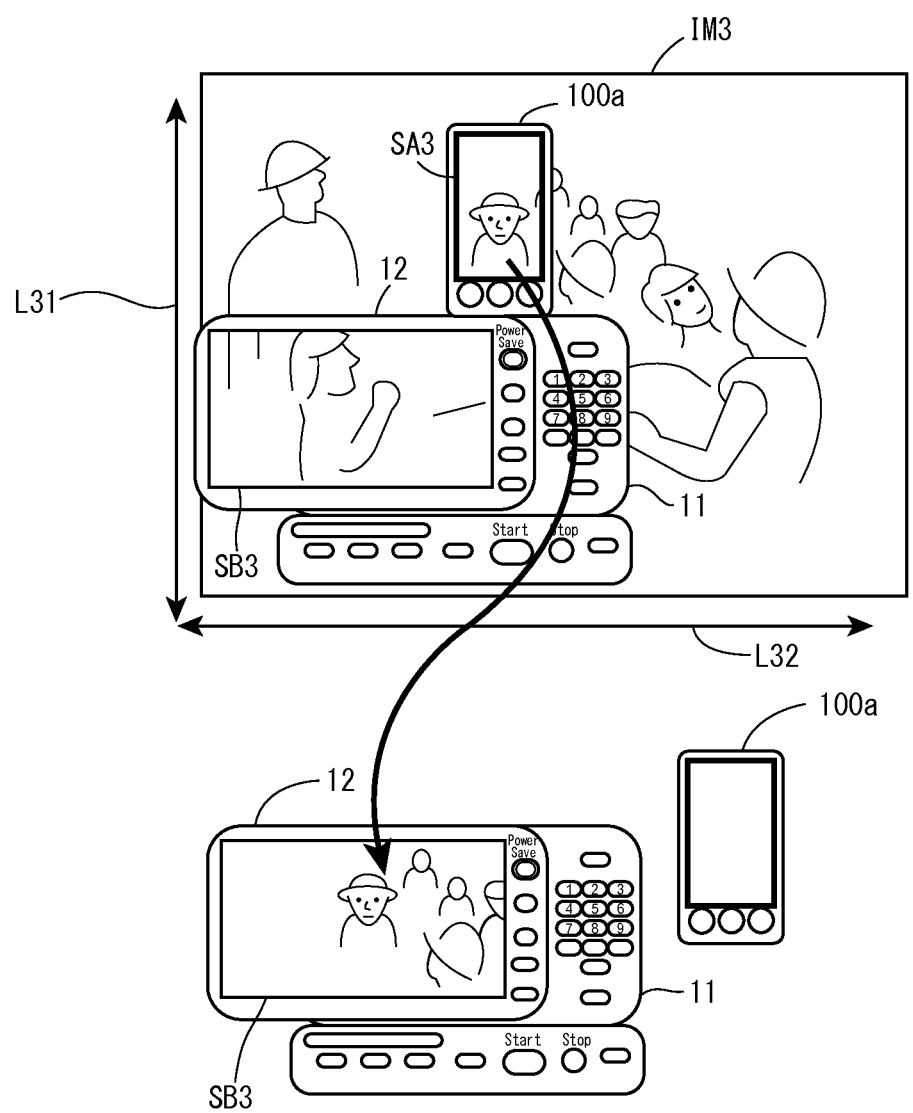
FIG. 15 is a diagram illustrating another example of the linked remote panel operation.

FIG. 15 is a diagram illustrating another linked remote panel operation. FIG. 15 shows a state in which the display 12 of the image processing apparatus 1 displays a display screen SB3. The display screen SB3 shows a partial region of a virtual display screen IM3. The virtual display screen IM3 has an area that is defined by a vertical span L31 and a lateral span L32 and exceeds the display area on the display 12. The display section 101 of the portable information terminal 100a displays a display screen SA3. The display screen SA3 shows another partial region of the virtual display screen IM3 that is un-overlapped with the display screen SB3 displayed on the display 12. Depending on the relative positional relationship between the display 12 and the display section 101, the display section 101 of the portable information terminal 100a may show, as the display screen SA3, still another partial region of the virtual display screen IM3 that is partially or entirely overlapped with the display screen SB3 displayed on the display 12.

The virtual display screen IM3 in this embodiment is the print preview data of an image that is to be subjected to printing and has been read by the scanner device 13 or has been transferred from the external PC or another external device. The virtual display screen is set to a shape with a magnification equivalent to a print size. The portable information terminal 100a obtains in advance the print preview data from the image processing apparatus 1 via communication. While in this embodiment the information display control section 103b obtains in advance full image data of the virtual display screen IM3, this should not be construed in a limiting sense. Another possible example is to obtain necessary data in the virtual display screen IM3 or the full image data from the image processing apparatus 1 in real time by, for example, communication. In this case, the information sending/receiving section 103c of the image processing section 103 controls information receipt and forwards received information to the information display control section 103b.

For example, as shown on the lower stage of FIG. 15, a display portion of the display screen SA3 can be subjected to centering on the display 12 by the user's double-clicking on a part of the display screen SA3 on the display section 101 of the portable information terminal 100a.

Thus, in the image processing apparatus 1, the display 12 is capable of displaying a partial region of the virtual display screen IM3, which has an area exceeding the display area on the display 12. The portable information terminal 100a is capable of obtaining the positional relationship information indicating the relative positional relationship between the display 12 and the display section 101. In the portable information terminal 100a, the display section 101 is capable of displaying, based on the positional relationship information, another partial region of the virtual display screen IM3 that is un-overlapped or overlapped with the partial region displayed on the display 12. This ensures that another partial region of the virtual display screen IM3 that is too large to be displayed only on the display 12 can be displayed on the display section 101 as if the virtual display screen IM3 is extended. This, in turn, ensures a linkage between the image processing apparatus 1 and the portable information terminal 100a while creating an augmented sense of reality. It is accordingly ensured to provide an image processing system capable of simulatively enlarging the area of the display section by using the augmented sense of reality. It is possible to for the user to, for example, move the portable information terminal 100a over the virtual display screen IM3 so as to observe details of the print preview screen while at the same time checking the full image with a magnification equivalent to an actual print size of the vertical span L31 and the lateral span L32. The relative relationship information indicating the relative positional relationship between the display 12 and the display section 101 of the portable information terminal 100a is obtained in a similar manner to the manner described in the first embodiment.

In the print preview, a possible configuration is to change the display content of the display 12 and/or the display section 101 of the portable information terminal 100a according to a change in the relative height of the display section 101 of the portable information terminal 100a with respect to the display 12 of the image processing apparatus 1 in the vertical direction of the display screen of the display 12. With this configuration, the display magnification of the portable information terminal 100a is changed according to the position of the portable information terminal 100a in the user's viewing direction. This ensures an equivalent viewing angle with respect to the display 12.

Figure 16:
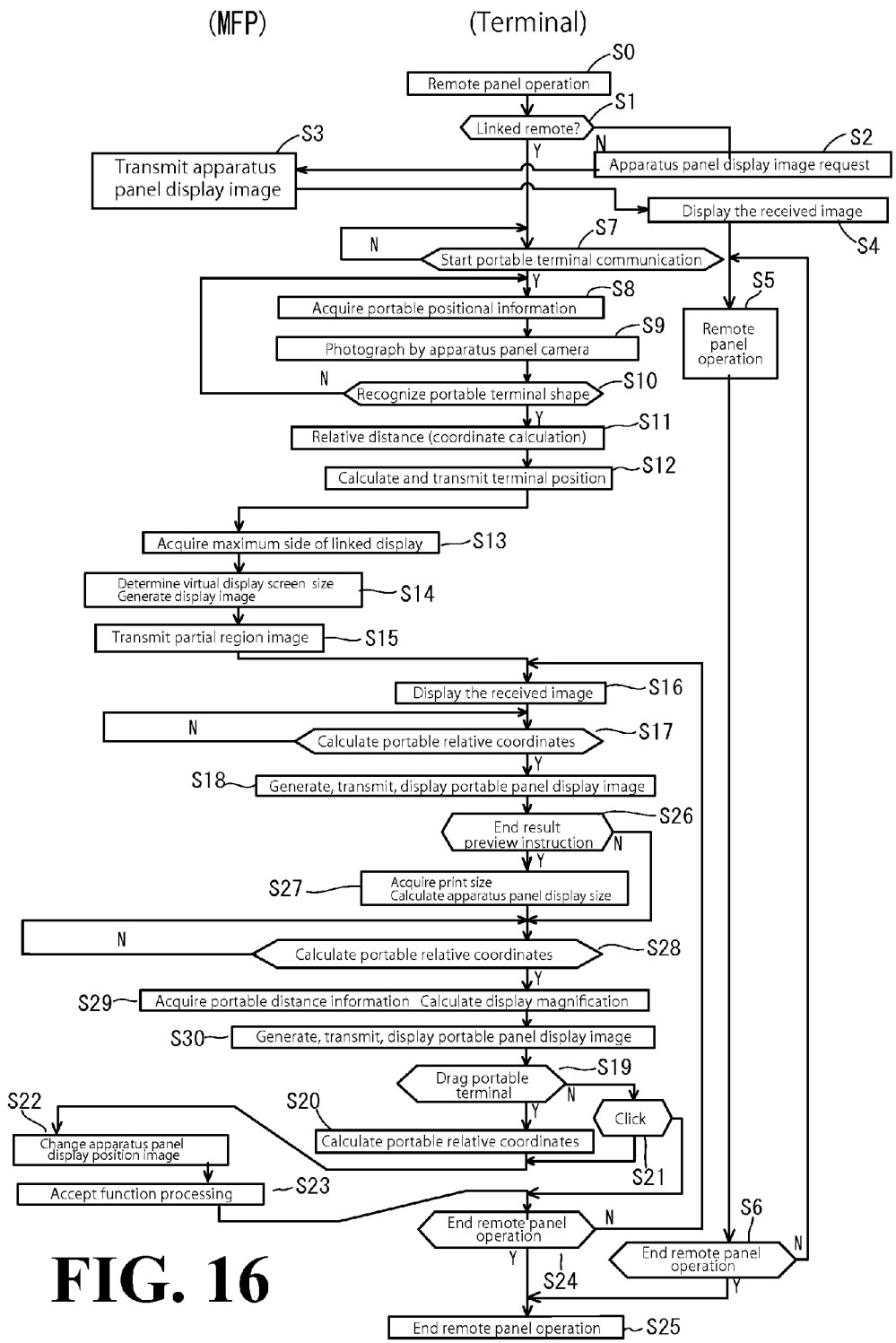
FIG. 16 is a flowchart illustrating processing performed by a portable information terminal and an image processing apparatus in the image processing system according to the second embodiment.

FIG. 16 is a flowchart illustrating processing performed by the portable information terminal 100a and the image processing apparatus 1 in the image processing system according to this embodiment, where the virtual display screen is a print preview screen.

The processings at steps S0 to S18 in this flowchart are similar to the processings at steps S0 to S18 in the flowchart according to the first embodiment shown in FIG. 5, and thus will not be elaborated here. After step S18, a determination is made as to whether a print preview has been instructed by the user (step S26). When the print preview has been instructed by the user, a print size of the print preview is obtained, and a display size on the display 12 is calculated (step S27). When no instruction for print preview is made yet by the user, step S27 is skipped.

When a movement of the portable information terminal 100a occurs, a determination is made as to whether relative coordinates of the portable information terminal 100a are already calculated (step S28). When the relative coordinates are not calculated yet, the procedure returns to step S28 and waits for calculation. When the relative coordinates are already calculated, information about a relative height of the portable information terminal 100a from the display 12 is obtained, and a display magnification associated with the information is calculated (step S29). Then, a part of the virtual display screen IM3 to be displayed on the display section 101 is generated and displayed on the display section 101 (step S30).

Then, the procedure proceeds to step S19 similar to step S19 in the flowchart according to the first embodiment shown in FIG. 5, and subsequent steps S19 to S25 are performed. The procedure according to the second embodiment is otherwise similar to the procedure in the image processing system according to the first embodiment, and thus will not be elaborated here.

Figure 19A:
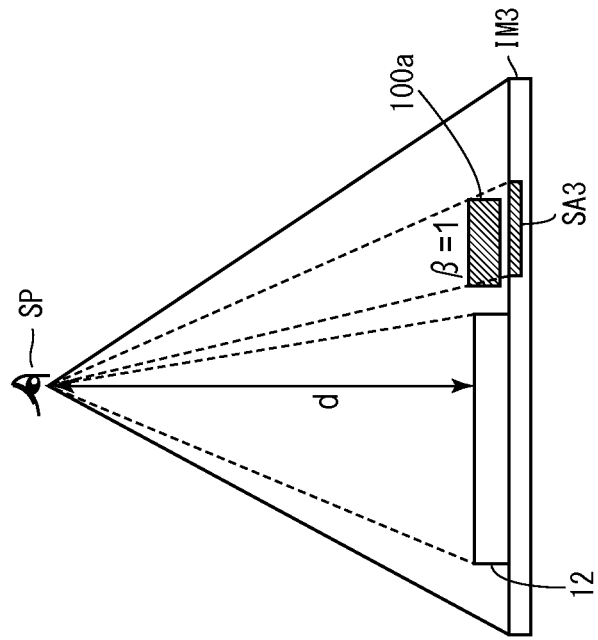
FIGS. 19A and 19B are diagrams respectively showing a difference in display content due to a relative height difference of the display section of the portable information terminal in a vertical direction from a display screen on a display of the image processing apparatus.
Figure 19B:
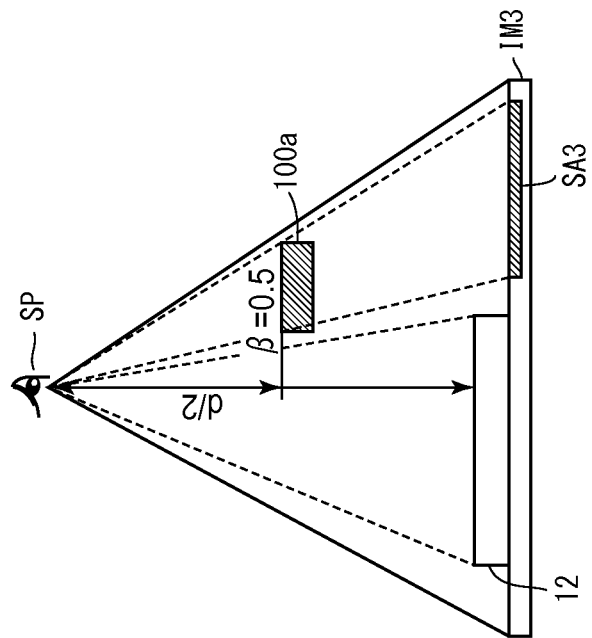

FIGS. 17A and 17B, 18A and 18B, and 19A and 19B are diagrams illustrating this respect. Specifically, FIGS. 17A and 17B and 18A and 18B are diagrams illustrating other examples of the linked remote panel operation. FIGS. 19A and 19B are diagrams illustrating a difference in display content due to a difference in the relative height of the display section 101 of the portable information terminal 100a in the vertical direction from the display screen on the display 12 of the image processing apparatus 1. FIG. 19A corresponds to FIGS. 17A and 17B, while FIG. 19B corresponds to FIGS. 18A and 18B.

FIG. 17A shows a display form of the virtual display screen IM3 on the display 12 and on the display section 101 of the portable information terminal 100a at the time when the portable information terminal 100a is disposed at a height corresponding to a position of a half d/2 of a vertical distance d between a user's view point SP and the display screen on the display 12. FIG. 17B shows only a display form on the display 12 and on the display section 101 of the portable information terminal 100a, with the display on the virtual display screen IM3 removed.

FIG. 18A shows a display form of the virtual display screen IM3 on the display 12 and on the display section 101 of the portable information terminal 100a at the time when the portable information terminal 100a is disposed at an approximately identical height level to the display 12. FIG. 18B shows only a display form on the display 12 and on the display section 101 of the portable information terminal 100a, with the display on the virtual display screen IM3 removed.

When the position of the portable information terminal 100a in its height direction is high when viewed from the display 12 as shown in FIGS. 17A and 17B and FIG. 19A, the display region for the display screen SA3 on the display section 101 may be enlarged (that is, the display magnification may be decreased). This ensures an equivalent viewing angle with respect to the display 12, and consequently with respect to the virtual display screen IM3. When the position of the portable information terminal 100a in its height direction is at an approximately identical height level to the display screen on the display 12 as shown in FIGS. 18A and 18B and FIG. 19B, the display region for the display screen SA3 on the display section 101 may be decreased (that is, the display magnification may be increased). This ensures an equivalent viewing angle with respect to the display 12, and consequently with respect to the virtual display screen IM3.

That is, a change in the relative height of the display section 101 with respect to the display 12 in the vertical direction from the display screen on the display 12 is included in the change in the positional relationship between the display 12 and the display section 101. Based on the change in the relative height, the portable information terminal 100a changes the display content of the display section 101. Thus, a change in the relative height between the display 12 and the display section 101 can also be used as a basis, and this further enhances the linkage between the image processing apparatus 1 and the portable information terminal 100a.

In this embodiment, the portable information terminal 100a changes the display content of the display section 101 based on the change in the relative height has been described above. Another possible configuration is that the portable information terminal 100a communicates with the image processing apparatus 1 so as to change the display content of the display 12 in the image processing apparatus 1. In this case, for example, the display magnification for the virtual display screen IM3 on the display 12 is increased/decreased, while the display magnification of the display screen SA3 on the display section 101 is kept constant.

Information about the relative height is easily obtainable from a photographed image by the photographing section 102 by determining the scale size of the display 12 and/or the vicinity of the display 12 by height position measurement using a distance measuring sensor or a similar device, or by image analysis using the image analysis section 103a of the image processing section 103.

Figure 20A:
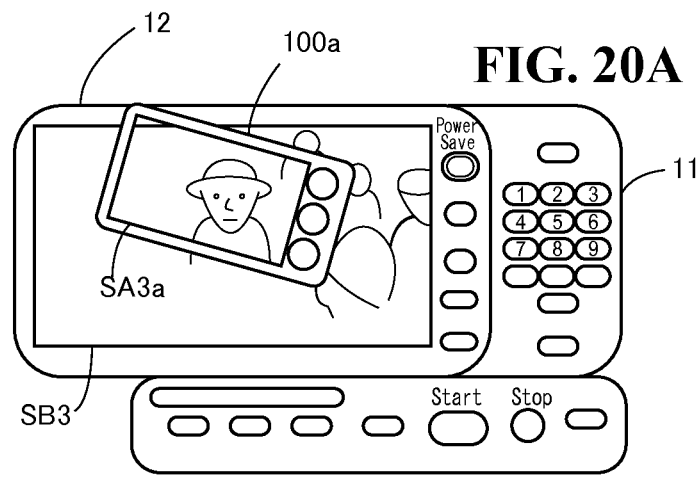
FIGS. 20A to 20C are diagrams illustrating other examples of the linked remote panel operation.
Figure 20B:
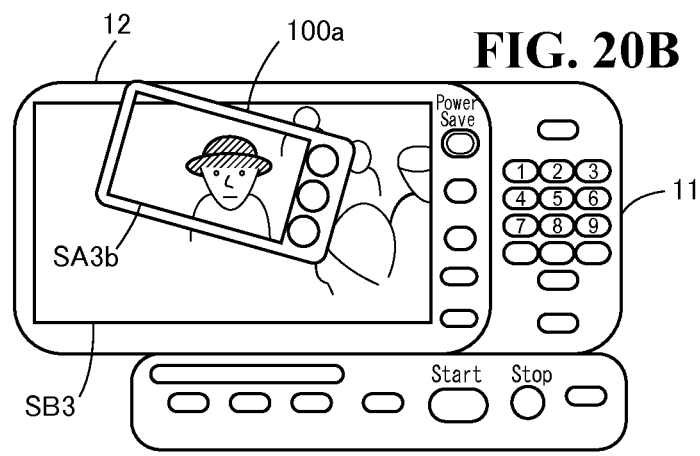
Figure 20C:
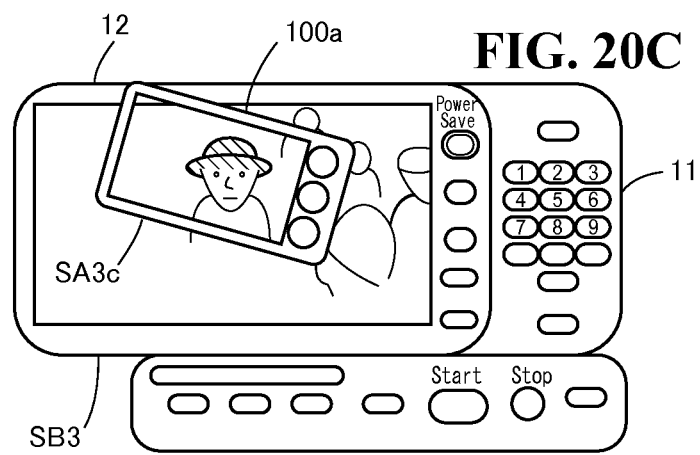

FIGS. 20A to 20C are diagrams illustrating other examples of the linked remote panel operation. When performing the print preview, the user may desire a sequential display of a series of preview images (for example, a series of similar images that are obtained from print images and partially different in color from each other) on the display 12 of the image processing apparatus 1. The linked remote panel operation is also applicable for this purpose.

Specifically, an N-th (N is an integer) print preview image of the series of print preview images is displayed on the display 12 of the image processing apparatus 1, and the portable information terminal 100a is disposed over the display 12. The other print preview images than the N-th print preview image of the print preview images are displayed on the display section 101 of the portable information terminal 100a. This enables checking for a difference between the N-th print preview image and the other print preview images.

FIG. 20A shows a case where, for example, the N-th print preview image of the series of print preview images is displayed on both the display 12 and the display section 101. As shown in FIG. 20A, a display screen SA3a is displayed as the display content of the display section 101.

FIG. 20B shows a case where, for example, the N-th print preview image of the series of print preview images is displayed on the display 12 while an (N−1)th print preview image of the series of print preview images is displayed on the display section 101. As shown in FIG. 20B, a display screen SA3b is displayed as the display content of the display section 101. The display screen SA3b is obtained by partially changing the display content of the display screen SA3a.

FIG. 20C shows a case where, for example, the N-th print preview image of the series of print preview images is displayed on the display 12, while an (N+1)th print preview image of the series of print preview images is displayed on the display section 101. As shown in FIG. 20C, a display screen SA3c is displayed as the display content of the display section 101. The display screen SA3c is obtained by partially changing the display content of the display screen SA3a.

Specifically, the virtual display screen includes a plurality of replaceable virtual display screens different from each other, such as the (N−1)th, N-th, and (N+1)th print preview images. The display 12 of the image processing apparatus 1 is capable of displaying a partial region of one of the plurality of virtual display screens (for example, the N-th print preview image). Based on the positional relationship information between the display 12 and the display section 101, the display section 101 of the portable information terminal 100a is capable of displaying a partial region of another one (for example, the (N+1)th print preview image) of the plurality of virtual display screens that does not correspond to the foregoing partial region (a portion outside the display region of the display 12) or that corresponds to the foregoing partial region (a portion within the display region of the display 12).

With this configuration, when the plurality of virtual display screens are a series of continuous print preview images, different portions in the series of print preview images can be easily checked on the portable information terminal 100a.

<Others>

While the above-described embodiments are regarding the image processing system, the image processing apparatus, and the potable information terminal, the embodiments should not be construed in a limiting sense. Another embodiment is regarding a program (application program) that is executable by every type of computer and causes every portable information terminal to perform the individual processing described in the embodiments. This ensures a linkage between the image processing apparatus and the portable information terminal while creating an augmented sense of reality. It is accordingly ensured to provide a program for a portable information terminal capable of simulatively enlarging the area of the display section by using the augmented sense of reality.

With the image processing apparatus according to the embodiments, the first display section is capable of displaying a partial region of a virtual display screen having an area exceeding the display area on the first display section. The portable information terminal is capable of obtaining positional relationship information indicating a relative positional relationship between the first display section of the image processing apparatus and the second display section of the portable information terminal. In the portable information terminal, the second display section is capable of displaying another partial region of the virtual display screen based on the positional relationship information. Hence, another partial region of the virtual display screen that is too large to be displayed on the first display section alone can be displayed on the second display section as if the virtual display screen is extended. This ensures a linkage between the image processing apparatus and the portable information terminal while creating an augmented sense of reality. It is accordingly ensured to simulatively enlarge the area of the display section by using the augmented sense of reality.

Based on the image photographed by the photographing section of the portable information terminal, the image processing section of the portable information terminal determines the relative position of the second display section with respect to the first display section by the image analysis so as to generate the positional relationship information. This ensures simulative enlargement of the area of the display section only by providing the photographing section and the image processing section in the portable information terminal without providing a special device in the image processing apparatus. Further, with the embodiment of the present invention, the positional relationship information can be generated based on the apparatus positional information and the position measuring signal obtained by the position measuring signal obtaining section. This ensures simulative enlargement of the area of the display section only by obtaining in advance the apparatus positional information about the position of the first display section of the image processing apparatus.

Upon detection of an operation to the portable information terminal and the image processing apparatus or detection of a change in the relative positional relationship of the second display section of the portable information terminal, the portable information terminal is capable of communicating with the image processing apparatus so as to change the display content of the first display section or the second display section based on the content of the operation and updated positional relationship information. This further enhances the linkage between the image processing apparatus and the portable information terminal. In this respect, by changing the display content based on, for example, a change in relative angle and a change in relative height between the first and second display section, the linkage between the image processing apparatus and the portable information terminal can be enhanced.

With the embodiments, when the operation section of the image processing apparatus is concealed behind the portable information terminal due to the relative positional relationship of the second display section of the portable information terminal with respect to the first display section of the image processing apparatus, the portable information terminal causes the second display section to display the terminal onscreen operation region that resembles the operation section and that is for an operation to the image processing apparatus via communication. Also in the image processing apparatus, the apparatus onscreen operation region is shifted on the first display section so as to change the display content so that the apparatus onscreen operation region may not be concealed behind the portable information terminal. Hence, even when the operation section of the image processing apparatus is concealed behind the portable information terminal, the terminal onscreen operation region or the apparatus onscreen operation region permits a continued operation to the image processing apparatus.

Additionally, at least one of the first display section and the second display section includes the touch screen function that permits the flick operation of scrolling the display content of the first display section or the second display section so as to change the speed of the scrolling. This improves the operability of the display section.

With the embodiment of the present invention, when replaceable first and second virtual display screens are included, the image processing apparatus allows the first display section to display a partial region of the first virtual display screen, while the portable information terminal allows the second display section to display a partial region of the second virtual display screen so as to oppose to a first lower hierarchy level display screen based on the positional relationship information. Hence, when the first and second virtual display screens are a series of continuous print preview images, it is easy to check different portions in the series of print preview images on the portable information terminal.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image processing system comprising:
    an image processing apparatus; and
    a portable information terminal communicable with the image processing apparatus, wherein the image processing apparatus comprises:
        a first display section;
        a storage section configured to store screen data to be displayed on the first display section; and
        a first control section configured to control the first display section to display an image indicating a first region contained in a virtual display screen corresponding to the screen data, and
    wherein the portable information terminal comprises:
        a second display section; and
        a second control section configured to control the second display section to display an interactive image indicating a second region generated correspondingly to positional relationship information indicating a relative positional relationship between the first display section and the second display section, wherein the portable information terminal, is configured to receive user input in response to the interactive image, the user input specifying a function to be performed by the image processing apparatus.

2. The image processing system according to claim 1, wherein the portable information terminal is configured to generate the positional relationship information and transmit the positional relationship information to the image processing apparatus, and
wherein the image processing apparatus is configured to generate an image indicating the second region based on the virtual display screen and the transmitted positional relationship information, and is configured to transmit the image to the portable information terminal.

3. The image processing system according to claim 2, wherein the portable information terminal further comprises a photographing section and an image processing section,
wherein in the portable information terminal, the photographing section is configured to photograph an image of at least one of the first display section of the image processing apparatus and a vicinity of the first display section, and
wherein based on the image of at least one of the first display section and the vicinity of the first display section, the image processing section is configured to determine a relative position of the second display section with respect to the first display section by image analysis so as to generate the positional relationship information.

4. The image processing system according to claim 2, wherein the portable information terminal comprises a position measuring signal obtaining section configured to obtain a position measuring signal from an outside, and
wherein the portable information terminal is configured to obtain in advance apparatus positional information about a position of the first display section of the image processing apparatus so as to generate the positional relationship information based on the apparatus positional information and the position measuring signal obtained by the position measuring signal obtaining section.

5. The image processing system according to claim 2, wherein the portable information terminal is communicable with the image processing apparatus so as to detect, upon occurrence of an operation to at least one of the portable information terminal and the image processing apparatus, a content of the operation, or so as to update the positional relationship information upon occurrence of a change in a relative positional relationship of the second display section of the portable information terminal with respect to the first display section of the image processing apparatus, and
wherein based on the content of the operation or the updated positional relationship information, the portable information terminal is configured to communicate with the image processing apparatus so as to change a display content of at least one of the first display section and the second display section.

6. The image processing system according to claim 1, wherein the portable information terminal further comprises a photographing section and an image processing section,
wherein in the portable information terminal, the photographing section is configured to photograph an image of at least one of the first display section of the image processing apparatus and a vicinity of the first display section, and wherein based on the image of at least one of the first display section and the vicinity of the first display section, the image processing section is configured to determine a relative position of the second display section with respect to the first display section by image analysis so as to generate the positional relationship information.

7. The image processing system according to claim 1, wherein the portable information terminal comprises a position measuring signal obtaining section configured to obtain a position measuring signal from an outside, and wherein the portable information terminal is configured to obtain in advance apparatus positional information about a position of the first display section of the image processing apparatus so as to generate the positional relationship information based on the apparatus positional information and the position measuring signal obtained by the position measuring signal obtaining section.

8. The image processing system according to claim 1, wherein the portable information terminal is communicable with the image processing apparatus so as to detect, upon occurrence of an operation to at least one of the portable information terminal and the image processing apparatus, a content of the operation, or so as to update the positional relationship information upon occurrence of a change in a relative positional relationship of the second display section of the portable information terminal with respect to the first display section of the image processing apparatus, and wherein based on the content of the operation or the updated positional relationship information, the portable information terminal is configured to communicate with the image processing apparatus so as to change a display content of at least one of the first display section and the second display section.

9. The image processing system according to claim 8, wherein the change in the positional relationship comprises a relative angle change in a long length direction or a short length direction of the second display section of the portable information terminal with respect to a long length direction or a short length direction of the first display section of the image processing apparatus, and wherein based on the relative angle change, the portable information terminal is configured to communicate with the image processing apparatus so as to change the display content of at least one of the first display section and the second display section.

10. The image processing system according to claim 8, wherein the change in the positional relationship comprises a relative height change of the second display section of the portable information terminal with respect to the first display section of the image processing apparatus in a vertical direction from a display screen on the first display section, and wherein based on the relative height change, the portable information terminal is configured to communicate with the image processing apparatus so as to change the display content of at least one of the first display section and the second display section.

11. The image processing system according to claim 10, wherein the image processing system is configured to decrease a display magnification in the display content of at least one of the first display section and the second display section upon an increase in the relative height position of the second display section with respect to the first display section, and wherein the image processing system is configured to increase the display magnification in the display content of at least one of the first display section and the second display section upon a decrease in the relative height position of the second display section with respect to the first display section.

12. The image processing system according to claim 1, wherein the image processing apparatus further comprises an operation section in a vicinity of the first display section, and wherein the portable information terminal is configured to obtain in advance information about a position of the operation section so as to cause the second display section to display a terminal onscreen operation region that resembles the operation section and that is for an operation to the image processing apparatus via communication when the operation section is concealed behind the portable information terminal due to a relative positional relationship of the second display section of the portable information terminal with respect to the first display section of the image processing apparatus.

13. The image processing system according to claim 1, wherein the image processing apparatus is configured to display an apparatus onscreen operation region on a screen of the first display section, the apparatus onscreen operation region being for an operation to the image processing apparatus, wherein the image processing apparatus is configured to obtain in advance information about a position of the apparatus onscreen operation region, wherein the image processing apparatus is configured to obtain the positional relationship information, and wherein when the apparatus onscreen operation region is concealed behind the portable information terminal due to a relative positional relationship of the second display section of the portable information terminal with respect to the first display section of the image processing apparatus, the image processing apparatus is configured to shift the apparatus onscreen operation region on the first display section so as to change a display content so that the apparatus onscreen operation region is not concealed behind the portable information terminal.

14. The image processing system according to claim 1, wherein at least one of the first display section and the second display section comprises a touch screen function that enables a flick operation of scrolling a display content by moving and flicking a display screen with a finger of a user or another object in contact with the display screen, so as to change a speed of the scrolling according to the relative positional relationship.

15. The image processing system according to claim 1, wherein the virtual display screen comprises at least replaceable first and second virtual display screens different from each other, wherein in the image processing apparatus, the first display section is configured to display a partial region of the first virtual display screen, and wherein in the portable information terminal, the second display section is configured to display, based on the positional relationship information, a partial region of the second virtual display screen corresponding to the partial region of the first virtual display screen.

16. An image processing apparatus communicable with a portable information terminal comprising:
- a first display section;
- a storage section configured to store screen data to be displayed on the first display section;
- a first control section configured to control the first display section to display an image indicating a first region contained in a virtual display screen corresponding to the screen data;
- a position obtaining section configured to obtain positional relationship information indicating a relative positional relationship between the first display section and a second display section disposed in the portable information terminal;
- an image generation section configured to generate an interactive image indicating a second region that is contained in the virtual display screen and is based on the positional relationship information obtained by the position obtaining section; and
- a transmission section configured to transmit the interactive image indicating the second region generated by the image generation section to the portable information terminal
- wherein, the image processing apparatus is configured to detect an user-selected operation input at the portable information terminal in response to the transmitted interactive image and perform a processing function in response to the detected operation.

17. The image processing apparatus according to claim 16,
- wherein the position obtaining section is configured to receive the positional relationship information generated in the portable information terminal,
- wherein the image generation section is configured to generate the image indicating the second region based on the virtual display screen and the positional relationship information received by the position obtaining section, and
- wherein the transmission section is configured to transmit the image indicating the second region generated by the image generation section to the portable information terminal.

18. A portable information terminal communicable with an image processing apparatus comprising:
- a second display section;
- a position obtaining section configured to obtain positional relationship information indicating a relative positional relationship between the second display section and a first display section disposed in the image processing apparatus; and
- a control section configured to control the second display section to display an interactive image indicating a region that is contained in a virtual display screen disposed in the image processing apparatus and is generated based on the positional relationship information so as to correspond to a relative positional relationship between the first display section and the second display section,
- wherein the portable information terminal is configured to receive, via a local input of the portable information terminal and in response to the displayed interactive image, a user selection of an operation to be performed by the image processing apparatus.

19. The portable information terminal according to claim 18, wherein the second control section is configured to transmit the positional relationship information to the image processing apparatus, and is configured to receive the image indicating the region generated by the image processing apparatus based on the virtual display screen and the positional relationship information so as to display the image on the second display section.

20. A non-transitory computer-readable storage medium storing a program for causing a portable information terminal to perform an operation, the portable information terminal being communicable with an image processing apparatus and comprising a second display section, the operation comprising:
- obtaining positional relationship information indicating a relative positional relationship between the second display section and a first display section disposed in the image processing apparatus; and
- displaying on the second display section an interactive image indicating a region that is contained in a virtual display screen generated in the image processing apparatus and is generated so as to correspond to the relative positional relationship between the first display section and the second display section based on the positional relationship information,
- receiving a user selection of an operation to be performed by the image processing apparatus in response to the displayed interactive image.

* * * * *